(12) United States Patent
Huang

(10) Patent No.: US 9,128,264 B2
(45) Date of Patent: Sep. 8, 2015

(54) IMAGE CAPTURING LENS ASSEMBLY AND IMAGE CAPTURING DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 127 days.

(21) Appl. No.: 14/018,444

(22) Filed: Sep. 5, 2013

(65) Prior Publication Data

US 2015/0042862 A1 Feb. 12, 2015

(30) Foreign Application Priority Data

Aug. 9, 2013 (TW) .............................. 102128672 A

(51) Int. Cl.
*G02B 13/18* (2006.01)
*G02B 9/62* (2006.01)
*H04N 5/225* (2006.01)
*G02B 13/00* (2006.01)

(52) U.S. Cl.
CPC .............. *G02B 9/62* (2013.01); *G02B 13/0045* (2013.01); *G02B 13/18* (2013.01); *H04N 5/2254* (2013.01)

(58) Field of Classification Search
CPC ...... G02B 13/18; G02B 13/0045; G02B 9/62; G02B 9/64

USPC .......................................... 359/713, 754–758
See application file for complete search history.

(56) References Cited

U.S. PATENT DOCUMENTS

| 5,313,330 A | 5/1994 | Betensky |
| 2012/0243108 A1* | 9/2012 | Tsai et al. ...................... 359/713 |
| 2012/0314301 A1* | 12/2012 | Huang et al. ................... 359/713 |
| 2013/0010181 A1 | 1/2013 | Baba |

FOREIGN PATENT DOCUMENTS

| JP | H03296705 A | 12/1991 |
| JP | 2002341242 A | 11/2002 |

\* cited by examiner

*Primary Examiner* — Darryl J Collins
*Assistant Examiner* — Kristina Deherrera
(74) *Attorney, Agent, or Firm* — CKC & Partners Co., Ltd.

(57) ABSTRACT

An image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has two surfaces being both aspheric, wherein at least one of the surfaces of the fifth lens element has at least one inflection point thereon. The sixth lens element with positive refractive power has an image-side surface being convex in a paraxial region thereof, wherein the surfaces of the sixth lens element are both aspheric.

26 Claims, 19 Drawing Sheets

IMAGE CAPTURING LENS ASSEMBLY AND IMAGE CAPTURING DEVICE

RELATED APPLICATIONS

This application claims priority to Taiwan Application Serial Number 102128672, filed Aug. 9, 2013, which is incorporated by reference herein in its entirety.

BACKGROUND

1. Technical Field

The present disclosure relates to an image capturing lens assembly. More particularly, the present disclosure relates to a compact image capturing lens assembly applicable to portable electronic products.

2. Description of Related Art

In recent years, with the popularity of mobile products having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile products with high-end specifications, such as smart phones and tablet personal computers, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the system cannot correct various aberrations of the system effectively due to the insufficient symmetry of the refractive power and the surface shapes of the first lens element and the sixth lens element of the system which thereby causes worse image quality. Moreover, the total track length cannot be reduced so as to restrict the application on the compact electronic device.

SUMMARY

According to one aspect of the present disclosure, an image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has an object-side surface and an image-side surface both being aspheric, wherein at least one of the object-side surface and the image-side surface of the fifth lens element has at least one inflection point thereon. The sixth lens element with positive refractive power has an image-side surface being convex in a paraxial region thereof, wherein an object-side surface and the image-side surface of the sixth lens element are both aspheric. The image capturing lens assembly has a total of six lens elements with refractive power, and an air distance is between two adjacent surfaces of any two adjacent lens elements. The image capturing lens assembly further includes a stop located between an object and the first lens element. When a focal length of the first lens element is f1, a focal length of the sixth lens element is f6, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and an axial distance between the object-side surface of the first lens element and the image-side surface of the sixth lens element is TD, the following conditions are satisfied:

$$0 < f1/f6 < 0.9; \text{ and}$$

$$0.55 < (CT1+CT2+CT3+CT4+CT5+CT6)/TD < 0.90.$$

According to another aspect of the present disclosure, an image capturing lens assembly includes, in order from an object side to an image side, a first lens element, a second lens element, a third lens element, a fourth lens element, a fifth lens element and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has an object-side surface and an image-side surface being both aspheric, wherein at least one of the object-side surface and the image-side surface has at least one inflection point thereon. The sixth lens element with positive refractive power has an image-side surface being convex in a paraxial region thereof, wherein an object-side surface and the image-side surface of the sixth lens element are both aspheric. The image capturing lens assembly has a total of six lens elements with refractive power, the age capturing lens assembly further includes a stop located between an object and the third lens element. When a focal length of the first lens element is f1, a focal length of the sixth lens element is f6, a curvature radius of the image-side surface of the fifth lens element is R10, and a curvature radius of the object-side surface of the sixth lens element is R11, the following conditions are satisfied:

$$0 < f1/f6 < 0.9; \text{ and}$$

$$-0.3 < R10/R11 < 0.5.$$

According to another aspect of the present disclosure, an image capturing device includes the image capturing lens assembly according to the foregoing aspect.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
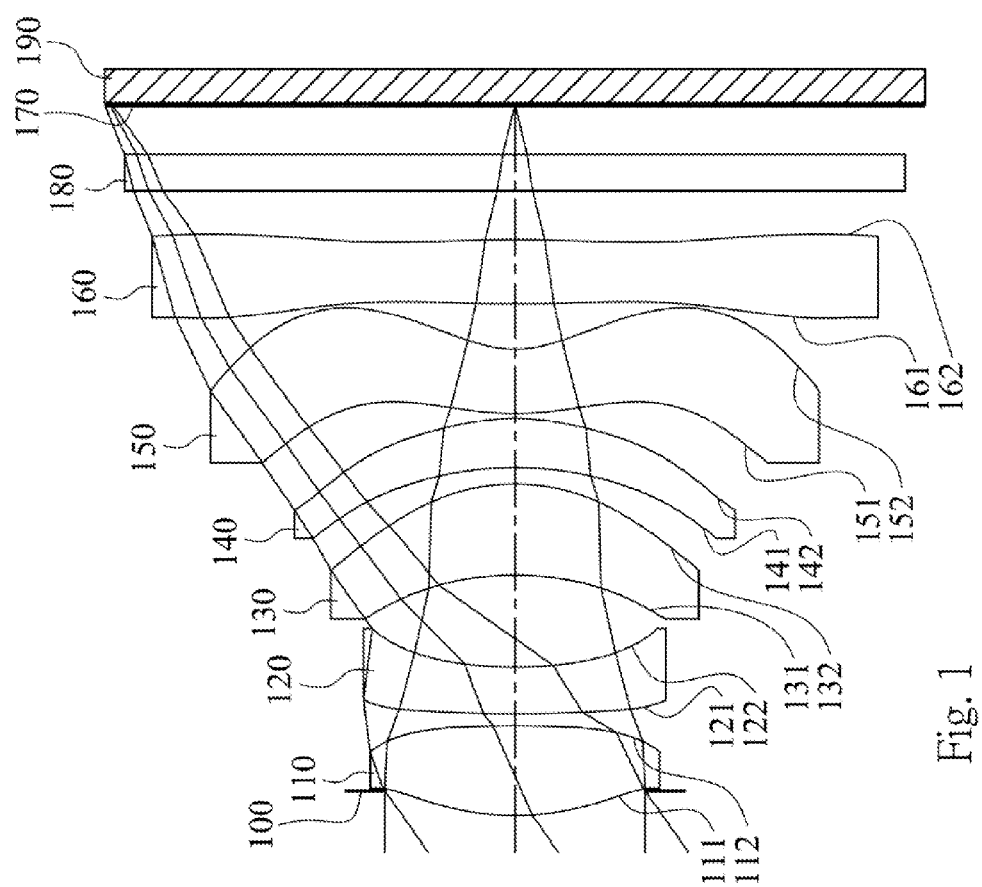
FIG. 1 is a schematic view of an image capturing lens assembly according to the 1st embodiment of the present disclosure.

An image capturing lens assembly includes, in order from an object side to an image side, a first lens element, a second lens element, a third lens element, a fourth lens element, a fifth lens element and a sixth lens element, wherein the image capturing lens assembly has a total of six lens element with refractive power. The image capturing lens assembly further includes a stop, such as an aperture stop, which is located between an object and the third lens element.

An air distance is between two adjacent surfaces of any two adjacent lens elements, that is, each of the first through sixth lens elements of the image capturing lens assembly is a single and non-cemented lens element. Moreover, the manufacturing process of the cemented lenses is more complex than the non-cemented lenses. In particular, an image-side surface of one lens and an object-side surface of the following lens need to have accurate curvature to ensure these two lens elements will be highly cemented. However, during the cementing process, those two lens elements might not be highly cemented due to displacement and it is thereby not favorable for the image quality of the image capturing lens assembly. Therefore, each of the six lens elements of the image capturing lens assembly is separated from each other in the present disclosure for improving the problem generated by the cemented lens elements.

The first lens element with positive refractive power has an object-side surface being convex in a paraxial region thereof. Therefore, the positive refractive power of the first lens element is adjusted for reducing the total track length of the image capturing lens assembly.

The second lens element with negative refractive power can have an image-side surface being concave in a paraxial region thereof, so that the aberration generated from the first lens element with positive refractive power can be corrected.

The third lens element can have positive refractive power, and can have an object-side surface being concave in a paraxial region thereof and an image-side surface being convex in a paraxial region thereof, that is, the third lens element is meniscus in the paraxial region thereof. Therefore, the excessive spherical aberration can be avoided, and the astigmatism can be reduced effectively.

The fourth lens element can have an object-side surface being concave in a paraxial region thereof and an image-side surface being convex in a paraxial region thereof, that is, the fourth lens element is meniscus in the paraxial region thereof. Therefore, the astigmatism can be corrected effectively.

The fifth lens element can have negative refractive power, and can have an object-side surface being convex in a paraxial region thereof and an image-side surface being concave in a paraxial region thereof, that is, the fifth lens element is meniscus in the paraxial region thereof. Therefore, the Petzval Sum of the image capturing lens assembly can be corrected for obtaining a sharper image. Furthermore, at least one of the object-side surface and the image-side surface of the fifth lens element has at least one inflection point thereon, so that the incident angle of the off-axis on the image plane can be reduced so as to increase the responding efficiency of an image sensor.

The sixth lens element with positive refractive power can have an object-side surface being convex in a paraxial region thereof, and has an image-side surface being convex in a paraxial region thereof. Therefore the characteristic of the symmetry of the image capturing lens assembly can be obtained by the cooperation of the sixth lens element and the convex object-side surface of the first lens element with positive refractive power for controlling the various aberrations, and the compact size of the image capturing lens assembly can also be obtained.

When a focal length of the first lens element is f1, and a focal length of the sixth lens element is f6, the following condition is satisfied: $0<f1/f6<0.9$. Therefore, the various aberrations of the image capturing lens assembly can be controlled and the total track length thereof can be reduced by the combination of the sixth lens element with positive refractive power and the first lens element with positive refractive power. Preferably, the following condition is satisfied: $0<f1/f6<0.5$.

When a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and an axial distance between the object-side surface of the first lens element and the image-side surface of the sixth lens element is TD, and the following condition is satisfied: $0.55<(CT1+CT2+CT3+CT4+CT5+CT6)/$ TD<0.90. Therefore, it is favorable for manufacturing the lens elements so as to obtain the compact size of the image capturing lens assembly.

When a curvature radius of the image-side surface of the fifth lens element is R10, and a curvature radius of the object-side surface of the sixth lens element is R11, the following condition is satisfied: −0.3<R10/R11<0.5. Therefore, the astigmatism can be corrected effectively.

When a focal length of the image capturing lens assembly is f, and a curvature radius of the image-side surface of the sixth lens element is R12, the following condition is satisfied: −10<(f/R12)×10<0. Therefore, the characteristic of the symmetry of the image capturing lens assembly can be obtained for controlling the various aberrations.

A stop can also be placed between the object and the first lens element, wherein when an axial distance between the stop and the image plane is SL, and an axial distance between the object-side surface of the first lens element and the image plane is TL, the following condition is satisfied: 0.80<SL/TL<1.20. Therefore, the total track length can be reduced so as to maintain the compact size of the image capturing lens assembly. Preferably, the following condition is satisfied: 0.93<SL/TL<1.10.

When an axial distance between the fourth lens element and the fifth lens element is T45, and an axial distance between the fifth lens element and the sixth lens element is T56, the following condition is satisfied: 0.03<T45/T56<0.45. Therefore, it is favorable for assembling the lens elements and increasing the yield rate thereof.

When an Abbe number of the second lens element is V2, the following condition is satisfied: V2<25. Therefore, the chromatic aberration of the image capturing lens assembly can be corrected.

When a curvature radius of the object-side surface of the third lens element is R5, and a curvature radius of the image-side surface of the third lens element is R6, the following condition is satisfied: 0.1<(R5−R6)/(R5+R6)<0.3. Therefore, the spherical aberration can be reduced.

When a vertical distance between a maximum effective semi-diameter position on the object-side surface of the first lens element and an optical axis is SD11, and a vertical distance between a maximum effective semi-diameter position on the image-side surface of the sixth lens element and the optical axis is SD62, the following condition is satisfied: 0.2<SD11/SD62<0.50. Therefore, it is favorable for correcting the aberration of the field of view on the off-axis region.

When an angle between a tangent line extended from a position on the object-side surface of the fifth lens element at a height of one third of the maximum effective semi-diameter and a normal line to an optical axis is ANG51a (wherein when the angle from the normal line to the tangent line is clockwise, ANG51a is positive; and when the angle from the normal line to the tangent line is counterclockwise, ANG51a is negative), and an angle between a tangent line extended from a maximum effective semi-diameter position on the object-side surface of the fifth lens element and a normal line to the optical axis is ANG51b (wherein when the angle from the normal line to the tangent line is clockwise, ANG51b is positive; and when the angle from the normal line to the tangent line is counterclockwise, ANG51b is negative, and |ANG51b|<90 degrees), the following condition is satisfied: −3.0<ANG51a/ANG51b<0. Therefore, the suitable shape of the lens element is favorable for not only the manufacturing and molding of the lens elements, but also obtaining desirable spacing reduction when assembling.

When an axial distance between the first lens element and the second lens element is T12, and an axial distance between the second lens element and the third lens element is T23, the following condition is satisfied: 0.03<T12/T23<0.4. Therefore, it is favorable for the assembling of the lens elements and increasing the yield rate.

When an axial distance between the image-side surface of the sixth lens element and an image plane is BL, which is a back focal length, and the axial distance between the object-side surface of the first lens element and the image plane is TL, the following condition is satisfied: 0<BL/TL<0.35. Therefore, the back focal length can be reduced so as to maintain the compact size.

When a curvature radius of an object-side surface of the fourth lens element is R7, and a curvature radius of an image-side surface of the fourth lens element is R8, the following condition is satisfied: −0.6<(R7−R8)/(R7+R8)<0.4. Therefore, the astigmatism can be corrected.

The image capturing lens assembly further includes an image sensor located on the image plane. When a maximum image height of the image capturing lens assembly is ImgH, and the axial distance between the object-side surface of the first lens element and the image plane is TL, the following condition is satisfied: TL/ImgH<2.0. Therefore, the compact size can be maintained for applied to the portable electronic product.

According to the image capturing lens assembly of the present disclosure, the lens elements can be made of plastic or glass material. When the lens elements are made of glass material, the distribution of the refractive power of the image capturing lens assembly can be more flexible to design. When the lens elements are made of plastic material, the manufacturing cost thereof can be reduced. Furthermore, surfaces of each lens element can be arranged to be aspheric to have more controllable variables for correcting the aberration thereof, and to further decrease the required number of the lens elements. Thus, the total track length of the image capturing lens assembly can be effectively reduced.

According to the image capturing lens assembly of the present disclosure, an aperture stop can be configured as a front stop or a middle stop. A front stop disposed between an imaged object and the first lens element can provide a longer distance between an exit pupil of the system and an image plane, which improves the image-sensing efficiency of the image sensor. A middle stop disposed between the first lens element and the image plane is favorable for enlarging the field of view of the system and thereby provides a wider field of view for the same.

According to the image capturing lens assembly of the present disclosure, the image capturing lens assembly can include at least one stop, such as an aperture stop, a glare stop or a field stop. Said glare stop or said field stop is for correcting the unexpected light and thereby improving the image quality thereof.

According to the image capturing lens assembly of the present disclosure, when a lens element has a convex surface, it indicates that the surface is convex in a paraxial region thereof; and when a lens element has a concave surface, it indicates that the surface is concave in a paraxial region thereof. Particularly, the paraxial region thereof refers to the region of the surface where light rays travel close to an optical axis and an off-axis region thereof refers to the region of the surface where light rays travel away from the optical axis.

According to the image capturing lens assembly of the present disclosure, the image capturing lens assembly provides good correction ability and high image quality, and can be applied to 3D (three-dimensional) image capturing applications, in products such as digital cameras, tablets, and other mobile devices.

According to the present disclosure, an image capturing device including the image capturing lens assembly according to the aforementioned image capturing lens assembly of the present disclosure is provided. Therefore, a balanced characteristic of the image capturing device for controlling the various aberrations, and the compact size of the image capturing device can be obtained.

According to the above description of the present disclosure, the following 1st-9th specific embodiments are provided for further explanation.

1st Embodiment

Figure 2:
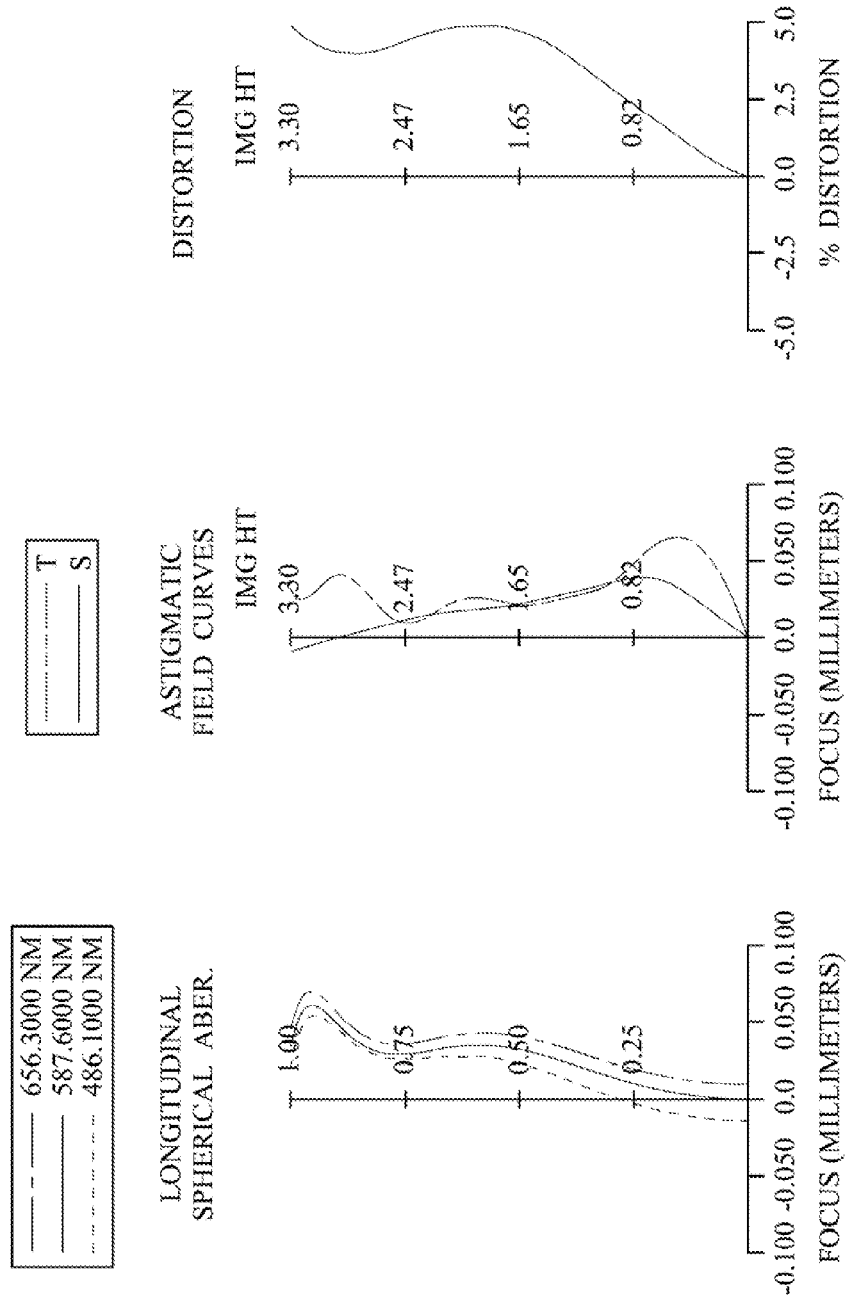
FIG. 2 shows spherical aberration curves, astigmatic field curves and a distortion curve of the image capturing lens assembly according to the 1st embodiment.

FIG. 1 is a schematic view of an image capturing lens assembly according to the 1st embodiment of the present disclosure. FIG. 2 shows spherical aberration curves, astigmatic field curves and a distortion curve of the image capturing lens assembly according to the 1st embodiment. In FIG. 1, the image capturing lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 180, an image plane 170 and an image sensor 190, wherein the image capturing lens assembly has a total of six lens elements with refractive power, and an air distance is between two adjacent surfaces of any two adjacent lens elements.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof, that is, the third lens element 130 is meniscus in the paraxial region thereof. The third lens element 130 is made of plastic material, and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof, that is, the fourth lens element 140 is meniscus in the paraxial region thereof. The fourth lens element 140 is made of plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof, that is, the fifth lens element 150 is meniscus in the paraxial region thereof. The fifth lens element 150 is made of plastic material and has the object-side surface 151 and the image-side surface 152 being both aspheric, wherein both of the object-side surface 151 and the image-side surface 152 of the fifth lens element 150 have inflection point thereon.

The sixth lens element 160 with positive refractive power has an object-side surface 161 being convex in the paraxial region thereof and an image-side surface 162 being convex in the paraxial region thereof. The sixth lens element 160 is made of plastic material, and has the object-side surface 161 and the image-side surface 162 being both aspheric.

The IR-cut filter 180 is made of glass material located between the sixth lens element 160 and the image plane 170, and not affect the focal length of the image capturing lens assembly.

The equation of the aspheric surface profiles of the aforementioned lens elements of the 1st embodiment is expressed as follows:

$$X(Y) = (Y^2/R)/(1 + sqrt(1-(1+k) \times (Y/R)^2)) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of the maximal field of view of the image capturing lens assembly is HFOV, these parameters have the following values: f=4.45 mm; Fno=210; and HFOV=351 degrees.

In the image capturing lens assembly according to the 1st embodiment, when an Abbe number of the second lens element 121 is V2, the following condition is satisfied: V2=21.4.

In the image capturing lens assembly according to the 1st embodiment, when an axial distance between the first lens element 110 and the second lens element 120 is T12, and an axial distance between the second lens element 120 and the third lens element 130 is T23, the following condition is satisfied: T12/T23=013.

In the image capturing lens assembly according to the 1st embodiment, when an axial distance between the fourth lens element 140 and the fifth lens element 150 is T45, and an axial distance between the fifth lens element 150 and the sixth lens element 160 is T56, the following condition is satisfied: T45/T56=0.11.

In the image capturing lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, and an axial distance between the object-side surface 111 of the first lens element 110 and the image-side surface 162 of the sixth lens element 160 is TD, the following condition is satisfied: (CT1+CT2+CT3+CT4+CT5+CT6)/TD=0.70.

In the image capturing lens assembly according to the 1st embodiment, when the focal length of the image capturing lens assembly is f, and a curvature radius of the image-side surface 162 of the sixth lens element 160 is R12, the following condition is satisfied: (f/R12)×10=−4.20.

In the image capturing lens assembly according to the 1st embodiment, when a curvature radius of the image-side surface 152 of the fifth lens element 150 is R10, and a curvature radius of the object-side surface 161 of the sixth lens element 160 is R11, the following condition is satisfied: R10/R11=0.07.

In the image capturing lens assembly according to the 1st embodiment, when a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following conditions are satisfied: (R5−R6)/(R5+R6)=0.18; and (R7−R8)/(R7+R8)=0.28.

In the image capturing lens assembly according to the 1st embodiment, when a focal length of the first lens element 110 is f1, and a focal length of the sixth lens element 160 is f6, the following condition is satisfied: f1/f6=0.32.

Figure 19:
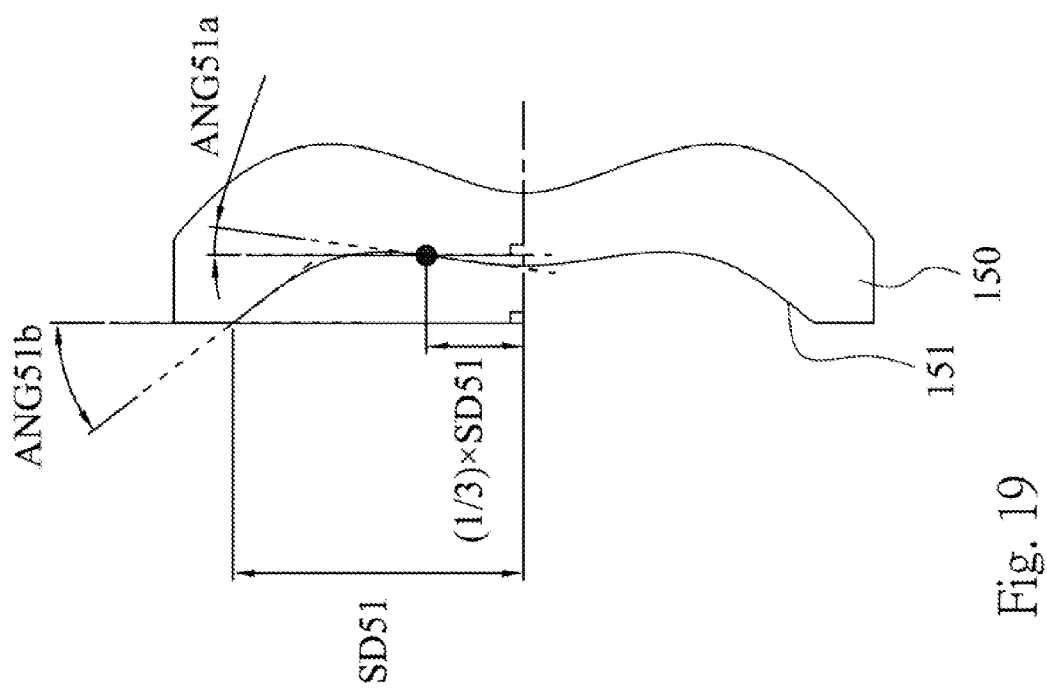
FIG. 19 shows a schematic view of the parameters ANG51$a$ and ANG51$b$ of the fifth lens element of the image capturing lens assembly of FIG. 1.

FIG. 19 shows a schematic view of the parameters ANG51$a$ and ANG51$b$ of the fifth lens element 150 of the image capturing lens assembly of FIG. 1. In FIG. 19, an angle between a tangent line extended from a position on the object-side surface 151 of the fifth lens element 150 at a height of one third of the maximum effective semi-diameter and a normal line to an optical axis is ANG51$a$, and an angle between a tangent line extended from a maximum effective semi-diameter position on the object-side surface 151 of the fifth lens element 150 and a normal line to the optical axis is ANG51$b$, the following condition is satisfied: ANG51$a$/ANG51$b$=−0.20.

In the image capturing lens assembly according to the 1st embodiment, when a vertical distance between a maximum effective semi-diameter position on the object-side surface 111 of the first lens element 110 and the optical axis is SD11, and a vertical distance between a maximum effective semi-diameter position on the image-side surface 162 of the sixth lens element 160 and the optical axis is SD62, the following condition is satisfied: SD11/SD62=0.36.

In the image capturing lens assembly according to the 1st embodiment, when an axial distance between the aperture stop 100 and the image plane 170 is SL, an axial distance between the object-side surface 111 of the first lens element 110 and the image plane 170 is TL, and an axial distance between the image-side surface 162 of the sixth lens element 160 and the image plane 170 is BL, the following conditions are satisfied: SL/TL=0.96; and BL/TL=0.19.

In the image capturing lens assembly according to the 1st embodiment, when a maximum image height of the image capturing lens assembly is ImgH, which is half of a diagonal length of an effective photosensitive area of the image sensor 190, and the axial distance between the object-side surface 111 of the first lens element 110 and the image plane 170 is TL, the following condition is satisfied: TL/ImgH=1.76.

The detailed optical data of the 1st embodiment are shown in Table 1 and the aspheric surface data are shown in Table 2 below.

TABLE 1

1st Embodiment
f = 4.45 mm, Fno = 2.10, HFOV = 35.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.205 | | | | |
| 2 | Lens 1 | 2.091 | ASP | 0.735 | Plastic | 1.535 | 56.3 | 3.41 |
| 3 | | −12.442 | ASP | 0.100 | | | | |
| 4 | Lens 2 | 12.102 | ASP | 0.376 | Plastic | 1.650 | 21.4 | −7.60 |
| 5 | | 3.465 | ASP | 0.754 | | | | |
| 6 | Lens 3 | −2.412 | ASP | 0.743 | Plastic | 1.514 | 56.8 | 7.78 |
| 7 | | −1.661 | ASP | 0.134 | | | | |
| 8 | Lens 4 | −2.822 | ASP | 0.401 | Plastic | 1.544 | 55.9 | 5.98 |
| 9 | | −1.587 | ASP | 0.040 | | | | |
| 10 | Lens 5 | 2.323 | ASP | 0.519 | Plastic | 1.543 | 56.5 | −2.77 |
| 11 | | 0.841 | ASP | 0.375 | | | | |
| 12 | Lens 6 | 11.832 | ASP | 0.520 | Plastic | 1.530 | 55.8 | 10.64 |
| 13 | | −10.614 | ASP | 0.400 | | | | |
| 14 | IR-cut filter | Plano | | 0.300 | Glass | 1.517 | 64.2 | — |
| 15 | | Plano | | 0.404 | | | | |
| 16 | Image | Plano | | — | | | | |

Note:
Reference wavelength is 587.6 nm (d-line).

TABLE 2

Aspheric Coefficients

| Surface # | 2 | 3 | 4 | 5 | 6 | 7 |
|---|---|---|---|---|---|---|
| k = | −6.5354E−01 | −5.0000E+01 | −7.3916E+00 | −6.3015E+00 | −1.2753E+01 | 8.4869E−02 |
| A4 = | −3.8042E−03 | −3.9902E−02 | 9.1734E−04 | 5.6446E−02 | −8.3394E−02 | −4.3539E−03 |
| A6 = | −2.2222E−02 | −4.0817E−02 | −2.1804E−02 | −3.5716E−02 | −1.1371E−02 | 1.3631E−02 |
| A8 = | 1.0774E−02 | 2.2320E−02 | 1.9136E−02 | 4.9258E−03 | 1.4230E−02 | 2.9472E−03 |
| A10 = | −1.5514E−02 | −1.1588E−02 | 8.8278E−03 | 1.1183E−02 | 4.3501E−03 | 1.0440E−03 |
| A12 = | −2.7704E−03 | 2.1344E−03 | −4.0121E−03 | −1.7191E−03 | −1.8181E−03 | 3.4611E−04 |
| A14 = | 8.3913E−11 | −1.3120E−03 | 7.2414E−05 | −4.8067E−04 | −6.0403E−04 | −4.7992E−05 |

TABLE 2-continued

| | Aspheric Coefficients | | | | | |
|---|---|---|---|---|---|---|
| Surface # | 8 | 9 | 10 | 11 | 12 | 13 |
| K = | −3.3149E−01 | −1.4255E+01 | −8.2481E+00 | −4.5895E+00 | −1.0000E+00 | −1.0000E+02 |
| A4 = | −3.8427E−03 | −3.1027E−02 | −8.1202E−02 | −5.9395E−02 | −2.9408E−02 | 2.4212E−02 |
| A6 = | 4.4990E−04 | −7.6720E−03 | 6.0612E−03 | 4.1438E−03 | 3.8735E−03 | −5.1044E−03 |
| A8 = | −1.1565E−03 | −2.6769E−04 | 3.1260E−04 | −1.6349E−04 | −5.7795E−05 | 3.8194E−04 |
| A10 = | −4.9654E−04 | 6.1278E−04 | −6.9163E−05 | 2.6517E−05 | −9.5863E−06 | −8.2725E−06 |
| A12 = | 8.0737E−05 | 3.1818E−05 | 1.3642E−05 | −2.6868E−06 | | 4.1204E−07 |
| A14 = | 4.7219E−05 | | | | | −5.0529E−08 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

2nd Embodiment

Figure 3:
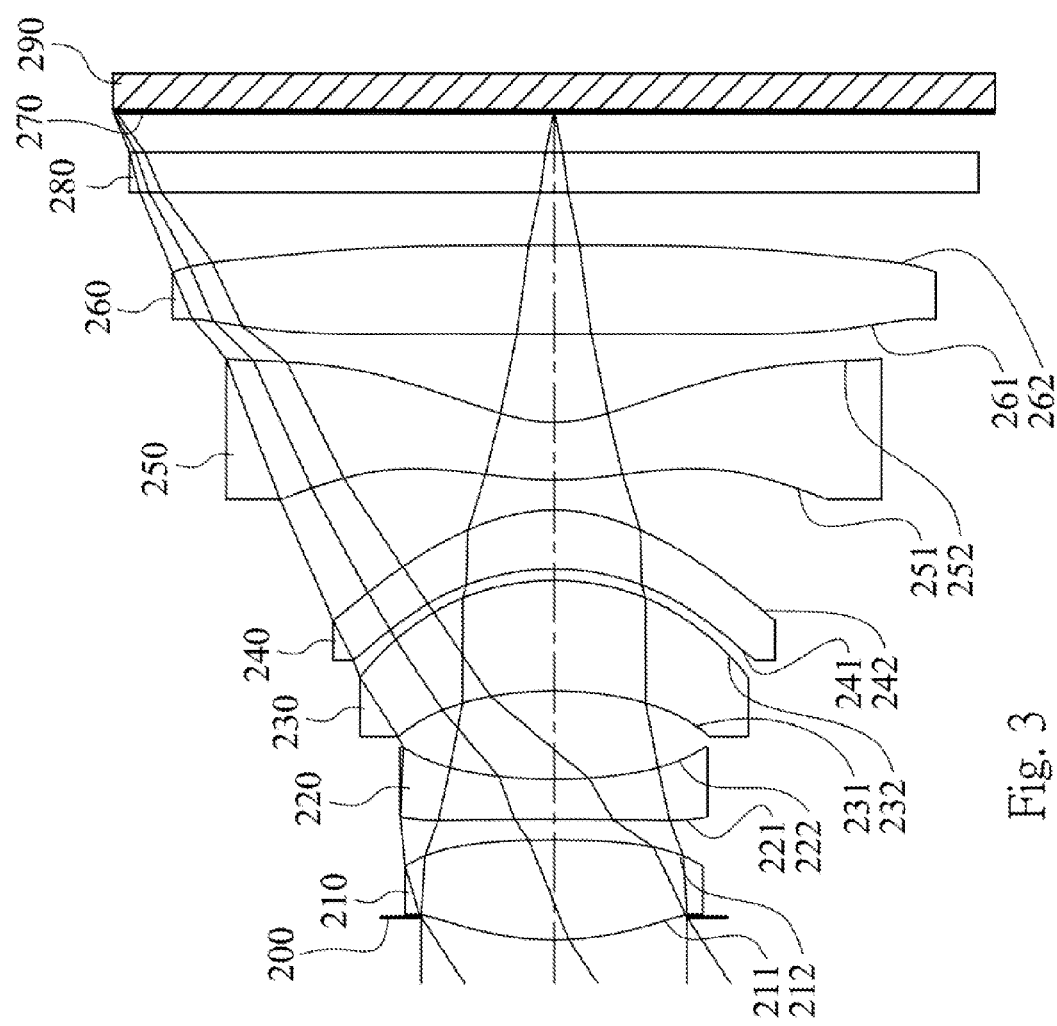
FIG. 3 is a schematic view of an image capturing lens assembly according to the 2nd embodiment of the present disclosure.
Figure 4:
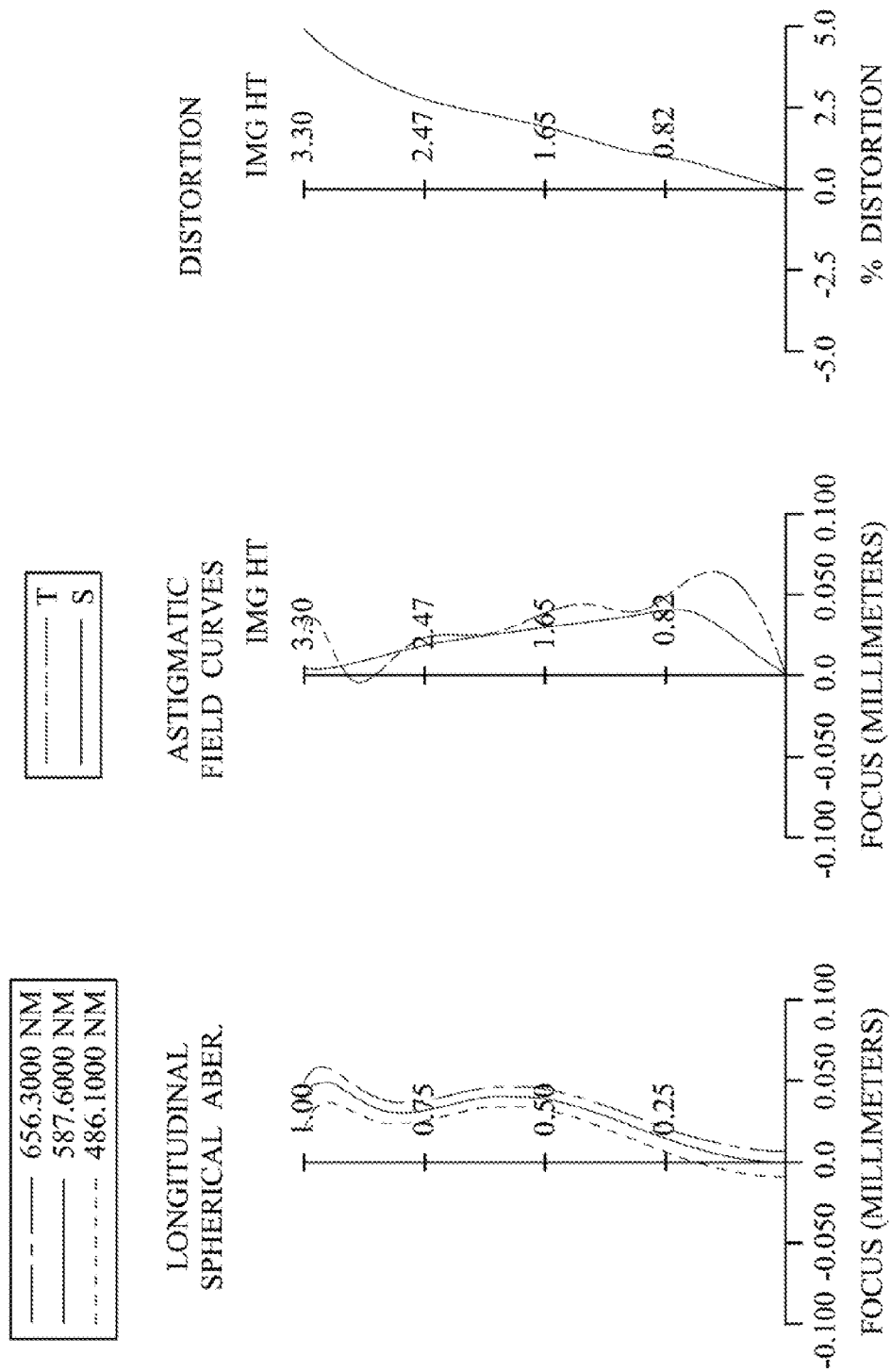
FIG. 4 shows spherical aberration curves, astigmatic field curves and a distortion curve of the image capturing lens assembly according to the 2nd embodiment.

FIG. 3 is a schematic view of an image capturing lens assembly according to the 2nd embodiment of the present disclosure. FIG. 4 shows spherical aberration curves, astigmatic field curves and a distortion curve of the image capturing lens assembly according to the 2nd embodiment. In FIG. 3, the image capturing lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 280, an image plane 270 and an image sensor 290, wherein the image capturing lens assembly has a total of six lens elements with refractive power, and an air distance is between two adjacent surfaces of any two adjacent lens elements.

The first lens element 210 with positive refractive power has an object-side surface 211 being convex in a paraxial region thereof and an image-side surface 212 being convex in a paraxial region thereof. The first lens element 210 is made of plastic material, and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof, that is, the third lens element 230 is meniscus in the paraxial region thereof. The third lens element 230 is made of plastic material, and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof, that is, the fourth lens element 240 is meniscus in the paraxial region thereof. The fourth lens element 240 is made of plastic material, and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof, that is, the fifth lens element 250 is meniscus in the paraxial region thereof. The fifth lens element 250 is made of plastic material and has the object-side surface 251 and the image-side surface 252 being both aspheric, wherein both of the object-side surface 251 and the image-side surface 252 of the fifth lens element 250 have inflection point thereon.

The sixth lens element 260 with positive refractive power has an object-side surface 261 being convex in the paraxial region thereof and an image-side surface 262 being convex in the paraxial region thereof. The sixth lens element 260 is made of plastic material, and has the object-side surface 261 and the image-side surface 262 being both aspheric.

The IR-cut filter 280 is made of glass material located between the sixth lens element 260 and the image plane 270, and will not affect the focal length of the image capturing lens assembly.

The detailed optical data of the 2nd embodiment are shown in Table 3 and the aspheric surface data are shown in Table 4 below.

TABLE 3

2nd Embodiment
f = 4.78 mm, Fno = 2.40, HFOV = 33.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.170 | | | | |
| 2 | Lens 1 | 2.234 | ASP | 0.749 | Plastic | 1.544 | 55.9 | 3.22 |
| 3 | | −7.179 | ASP | 0.154 | | | | |
| 4 | Lens 2 | −67.729 | ASP | 0.300 | Plastic | 1.639 | 23.5 | −6.01 |
| 5 | | 4.081 | ASP | 0.658 | | | | |
| 6 | Lens 3 | −2.815 | ASP | 0.828 | Plastic | 1.614 | 25.6 | 6.77 |
| 7 | | −1.866 | ASP | 0.086 | | | | |

TABLE 3-continued

2nd Embodiment
f = 4.78 mm, Fno = 2.40, HFOV = 33.2 deg.

| Surface # | | Curvature Radius | | Thickness | Material | Index | Abbe # | Focal Length |
|---|---|---|---|---|---|---|---|---|
| 8 | Lens 4 | −1.822 | ASP | 0.445 | Plastic | 1.544 | 55.9 | 6.52 |
| 9 | | −1.307 | ASP | 0.221 | | | | |
| 10 | Lens 5 | 2.276 | ASP | 0.436 | Plastic | 1.633 | 23.4 | −3.39 |
| 11 | | 1.022 | ASP | 0.662 | | | | |
| 12 | Lens 6 | 87.474 | ASP | 0.661 | Plastic | 1.535 | 55.7 | 139.21 |
| 13 | | −500.000 | ASP | 0.400 | | | | |
| 14 | IR-cut filter | Plano | | 0.300 | Glass | 1.517 | 64.2 | — |
| 15 | | Plano | | 0.305 | | | | |
| 16 | Image | Plano | | — | | | | |

Note:
Reference wavelength is 587.6 nm (d-line).

TABLE 4

Aspheric Coefficients

| Surface # | 2 | 3 | 4 | 5 | 6 | 7 |
|---|---|---|---|---|---|---|
| k = | −7.1518E−01 | −4.7619E+01 | −5.0000E+01 | −1.1072E+01 | −7.7115E+00 | 2.1236E−01 |
| A4 = | −5.2458E−03 | −4.9196E−02 | 3.1353E−03 | 5.1377E−02 | −6.1552E−02 | −3.6671E−03 |
| A6 = | −2.3627E−02 | −3.3934E−02 | −2.4345E−02 | −44904E−03 | −8.7722E−03 | −2.6820E−04 |
| A8 = | 1.1854E−02 | 1.7983E−02 | 2.2794E−02 | 3.2464E−03 | 7.6762E−04 | 4.8989E−04 |
| A10 = | −1.8509E−02 | −1.2311E−02 | 7.8465E−03 | 9.5370E−03 | −3.3417E−03 | 3.8472E−04 |
| A12 = | −2.7808E−03 | 1.6024E−03 | −4.7216E−03 | −6.8843E−04 | 9.2420E−04 | 1.8845E−04 |
| A14 = | | −7.9084E−04 | 5.3576E−04 | −6.7954E−04 | | |

| Surface # | 8 | 9 | 10 | 11 | 12 | 13 |
|---|---|---|---|---|---|---|
| k = | −3.4385E−02 | −2.6628E+00 | −2.8534E+01 | −5.4553E+00 | −1.0000E+00 | −1.0000E+02 |
| A4 = | 2.5320E−03 | −1.8474E−02 | −4.5790E−02 | −3.7227E−02 | −6.5437E−03 | −6.3546E−03 |
| A6 = | 1.7896E−03 | −1.6205E−03 | 3.5451E−03 | 6.6428E−03 | 1.9139E−03 | 2.8398E−04 |
| A8 = | 5.1302E−04 | −4.8545E−04 | 4.6148E−04 | −5.5660E−04 | −4.9709E−05 | 7.9831E−05 |
| A10 = | 3.6554E−04 | 4.2234E−04 | −6.4353E−05 | 1.0428E−05 | −8.9079E−06 | −6.9643E−06 |
| A12 = | 2.4580E−04 | 6.0231E−05 | 5.2598E−06 | 1.3398E−06 | | 8.6846E−07 |
| A14 = | | | | | | −1.1598E−07 |

In the image capturing lens assembly according to the 2nd embodiment, the definitions of these parameters shown in the following table are the same as those stated in the 1st embodiment with corresponding values for the 2nd embodiment. Moreover, these parameters can be calculated from Table 3 and Table 4 as the following values and satisfy the following conditions:

| 2nd Embodiment | | | |
|---|---|---|---|
| f (mm) | 4.78 | (R5 − R6)/(R5 + R6) | 0.20 |
| Fno | 2.40 | (R7 − R8)/(R7 + R8) | 0.16 |
| HFOV (deg.) | 33.2 | f1/f6 | 0.02 |
| V2 | 23.5 | ANG51a/ANG51b | −0.36 |
| T12/T23 | 0.23 | SD11/SD62 | 0.35 |
| T45/T56 | 0.33 | SL/TL | 0.97 |
| (CT1 + CT2 + CT3 + CT4 + CT5 + CT6)/TD | 0.66 | BL/TL | 0.16 |
| (f/R12)*10 | −0.10 | TL/ImgH | 1.88 |
| R10/R11 | 0.01 | | |

3rd Embodiment

Figure 5:
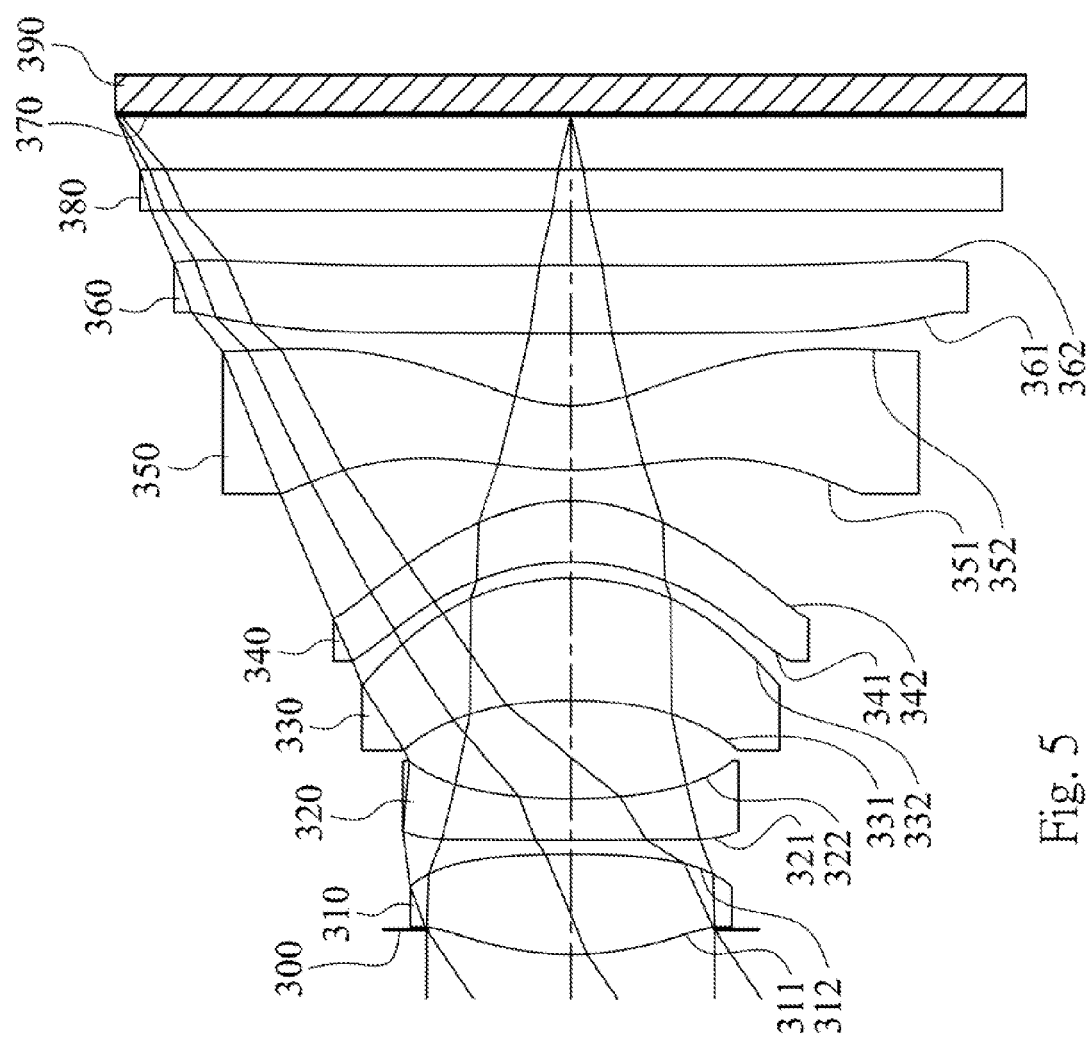
FIG. 5 is a schematic view of an image capturing lens assembly according to the 3rd embodiment of the present disclosure.
Figure 6:
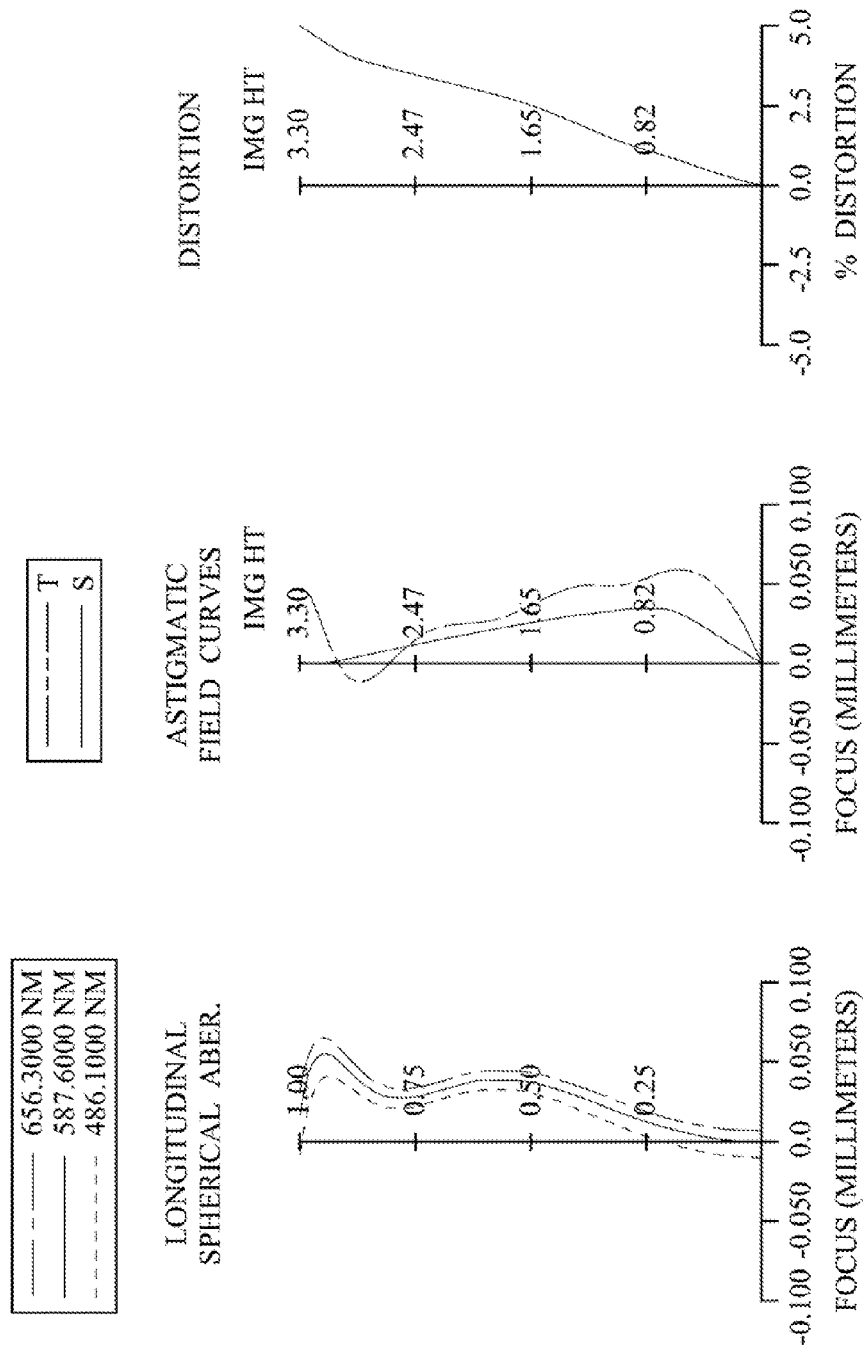
FIG. 6 shows spherical aberration curves, astigmatic field curves and a distortion curve of the image capturing lens assembly according to the 3rd embodiment.

FIG. 5 is a schematic view of an image capturing lens assembly according to the 3rd embodiment of the present disclosure. FIG. 6 shows spherical aberration curves, astigmatic field curves and a distortion curve of the image capturing lens assembly according to the 3rd embodiment. In FIG. 5, the image capturing lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390, wherein the image capturing lens assembly has a total of six lens elements with refractive power, and an air distance is between two adjacent surfaces of any two adjacent lens elements.

The first lens element 310 with positive refractive power has an object-side surface 311 being convex in a paraxial region thereof and an image-side surface 312 being convex in a paraxial region thereof. The first lens element 310 is made of plastic material, and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material, and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof, that is, the third lens element 330 is meniscus in the paraxial region thereof. The third lens element 330 is made of plastic material, and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof, that is, the fourth lens element 340 is meniscus in the paraxial region thereof. The fourth lens element 340 is made of plastic material, and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof, that is, the fifth lens element 350 is meniscus in the paraxial region thereof. The fifth lens element 350 is made of plastic material and has the object-side surface 351 and the image-side surface 352 being both aspheric, wherein both of the object-side surface 351 and the image-side surface 352 of the fifth lens element 350 have inflection point thereon.

The sixth lens element 360 with positive refractive power has an object-side surface 361 being convex in the paraxial region thereof and an image-side surface 362 being convex in the paraxial region thereof. The sixth lens element 360 is made of plastic material, and has the object-side surface 361 and the image-side surface 362 being both aspheric.

The IR-cut filter 380 is made of glass material located between the sixth lens element 360 and the image plane 370, and will not affect the focal length of the image capturing lens assembly.

The detailed optical data of the 3rd embodiment are shown in Table 5 and the aspheric surface data are shown in Table 6 below.

TABLE 5

3rd Embodiment
f = 4.60 mm, Fno = 2.20, HFOV = 34.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.175 | | | | |
| 2 | Lens 1 | 2.259 | ASP | 0.727 | Plastic | 1.544 | 55.9 | 3.32 |
| 3 | | −7.947 | ASP | 0.102 | | | | |
| 4 | Lens 2 | 88.912 | ASP | 0.300 | Plastic | 1.639 | 23.5 | −6.79 |
| 5 | | 4.133 | ASP | 0.715 | | | | |
| 6 | Lens 3 | −2.883 | ASP | 0.888 | Plastic | 1.583 | 30.2 | 6.47 |
| 7 | | −1.820 | ASP | 0.116 | | | | |
| 8 | Lens 4 | −1.782 | ASP | 0.443 | Plastic | 1.544 | 55.9 | 7.24 |
| 9 | | −1.334 | ASP | 0.222 | | | | |
| 10 | Lens 5 | 2.268 | ASP | 0.473 | Plastic | 1.633 | 23.4 | −3.45 |
| 11 | | 1.023 | ASP | 0.523 | | | | |
| 12 | Lens 6 | 48.705 | ASP | 0.492 | Plastic | 1.535 | 55.7 | 51.81 |
| 13 | | −64.103 | ASP | 0.400 | | | | |
| 14 | IR-cut filter | Plano | | 0.300 | Glass | 1.517 | 64.2 | — |
| 15 | | Plano | | 0.400 | | | | |
| 16 | Image | Plano | | — | | | | |

Note:
Reference wavelength is 587.6 nm (d-line).

TABLE 6

Aspheric Coefficients

| Surface # | 2 | 3 | 4 | 5 | 6 | 7 |
|---|---|---|---|---|---|---|
| K = | −7.2192E−01 | −5.2107E+01 | 6.5829E+00 | −1.0265E+01 | −8.4833E+00 | 1.6343E−01 |
| A4 = | −5.3635E−03 | −4.8807E−02 | 4.0929E−03 | 5.1954E−02 | −6.2508E−02 | −4.4054E−03 |
| A6 = | −2.3169E−02 | −3.3516E−02 | −2.3957E−02 | −4.2236E−03 | −1.0093E−02 | 9.0358E−04 |
| A8 = | 1.2546E−02 | 1.8464E−02 | 2.3478E−02 | 3.4595E−03 | 1.8456E−03 | 8.8614E−04 |
| A10 = | −1.8300E−02 | −1.1795E−02 | 7.9705E−03 | 9.4064E−03 | −1.6097E−03 | 6.0077E−04 |
| A12 = | −3.1822E−03 | 2.1104E−03 | −4.9849E−03 | −8.4772E−04 | 9.3955E−04 | 3.1473E−04 |
| A14 = | | −1.3120E−03 | 4.7319E−04 | −6.2119E−04 | | |

| Surface # | 8 | 9 | 10 | 11 | 12 | 13 |
|---|---|---|---|---|---|---|
| k = | −5.8095E−02 | −2.6694E+00 | −2.5237E+01 | −5.2835E+00 | −1.0000E+00 | −1.0000E+02 |
| A4 = | 4.2933E−03 | −1.7682E−02 | −4.6076E−02 | −4.1182E−02 | −6.2474E−03 | 3.9490E−03 |
| A6 = | 2.7520E−03 | −1.7749E−02 | 3.4302E−02 | 6.7167E−03 | 1.9342E−03 | −2.1368E−04 |
| A8 = | 9.7286E−04 | −5.8251E−04 | 4.4423E−04 | −5.3400E−04 | −1.1728E−04 | −2.3993E−05 |
| A10 = | 4.8845E−04 | 4.3308E−04 | −6.8480E−05 | 1.2154E−05 | −8.4819E−07 | −5.0626E−06 |
| A12 = | 2.5762E−04 | 6.7214E−05 | 4.8582E−06 | 1.0930E−06 | | 2.0601E−06 |
| A14 = | | | | | | −1.5800E−07 |

In the image capturing lens assembly according to the 3rd embodiment, the definitions of these parameters shown in the following table are the same as those stated in the 1st embodiment with corresponding values for the 3rd embodiment. Moreover, these parameters can be calculated from Table 5 and Table 6 as the following values and satisfy the following conditions:

| 3rd Embodiment | | | |
|---|---|---|---|
| f (mm) | 4.60 | (R5 − R6)/(R5 + R6) | 0.23 |
| Fno | 2.20 | (R7 − R8)/(R7 + R8) | 0.14 |
| HFOV (deg.) | 34.2 | f1/f6 | 0.06 |
| V2 | 23.5 | ANG51a/ANG51b | −0.31 |
| T12/T23 | 0.14 | SD11/SD62 | 0.37 |
| T45/T56 | 0.42 | SL/TL | 0.97 |
| (CT1 + CT2 + CT3 + CT4 + CT5 + CT6)/TD | 0.66 | BL/TL | 0.18 |
| (f/R12)*10 | −0.72 | TL/ImgH | 1.85 |
| R10/R11 | 0.02 | | |

4th Embodiment

Figure 7:
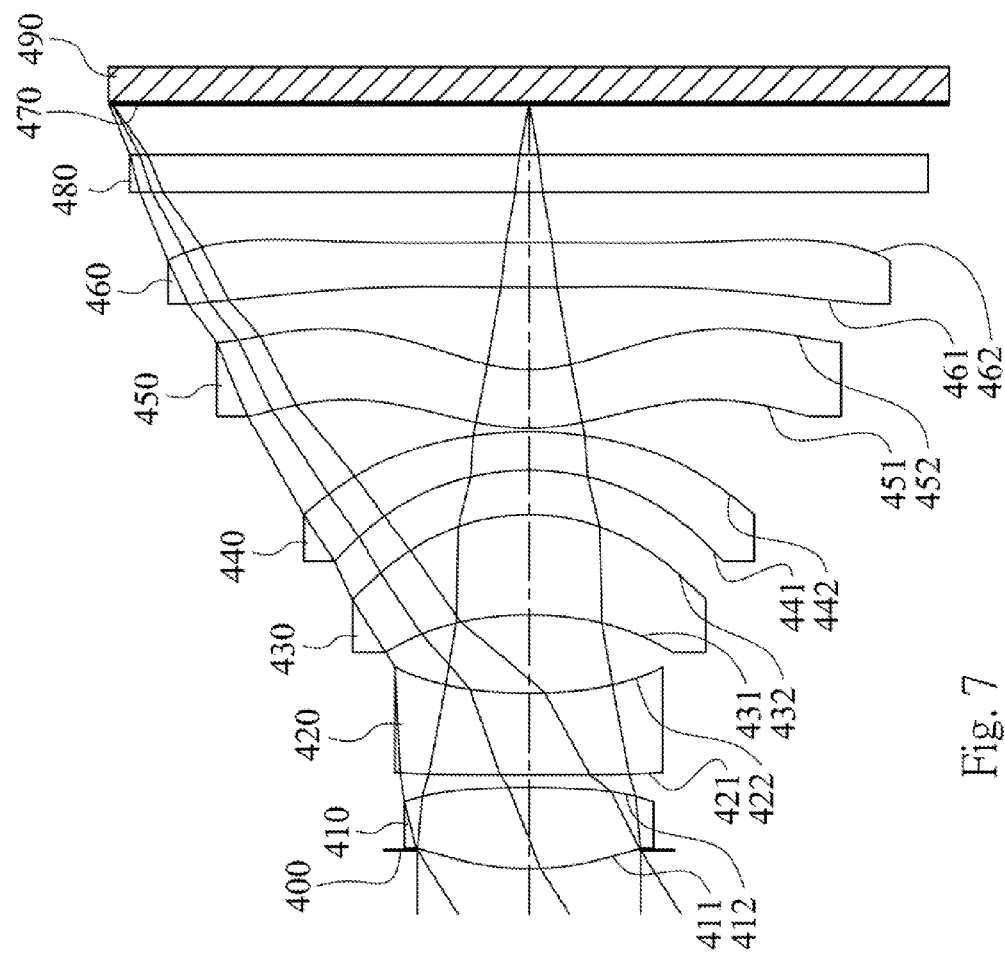
FIG. 7 is a schematic view of an image capturing lens assembly according to the 4th embodiment of the present disclosure.
Figure 8:
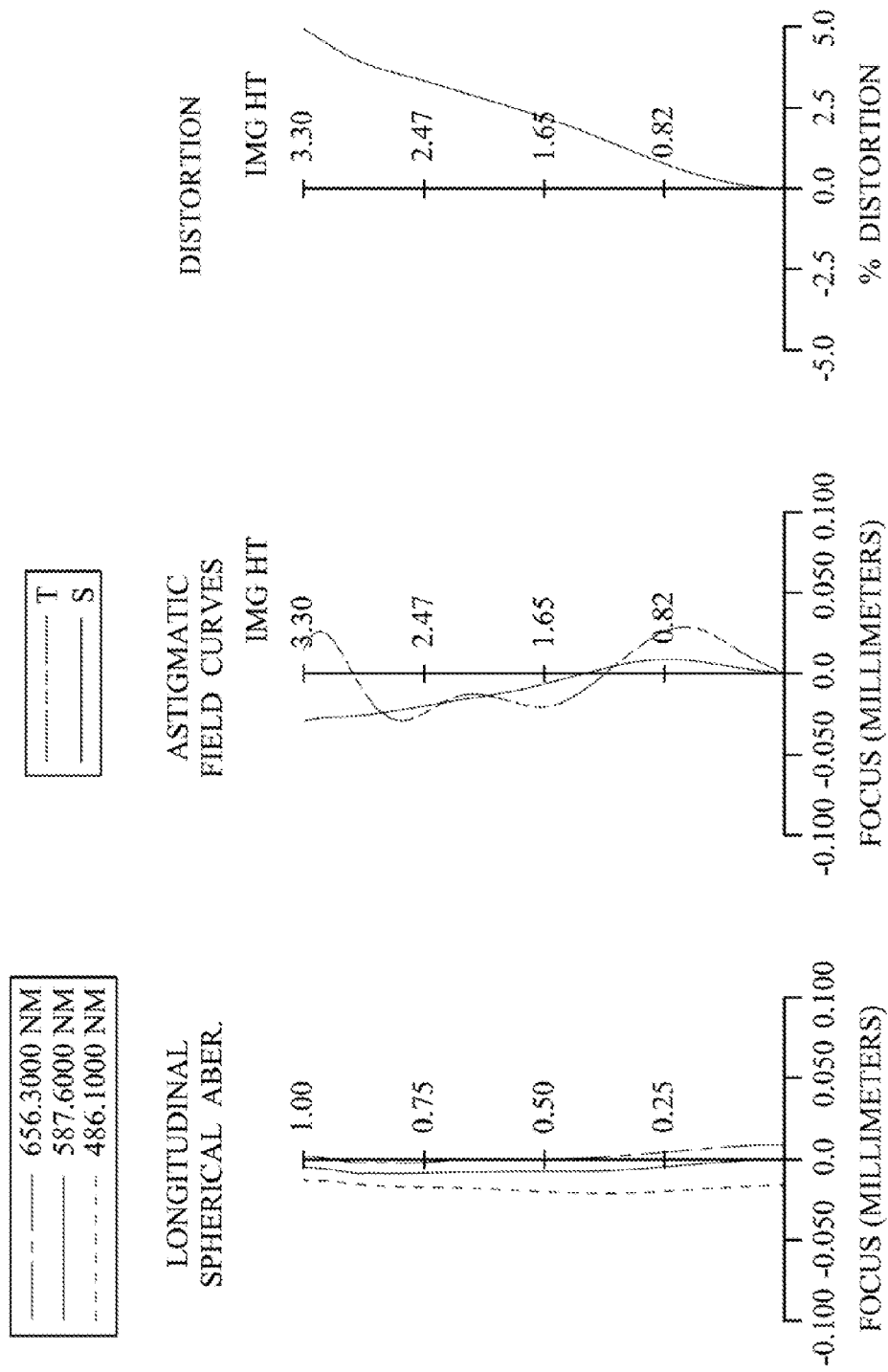
FIG. 8 shows spherical aberration curves, astigmatic field curves and a distortion curve of the image capturing lens assembly according to the 4th embodiment.

FIG. 7 is a schematic view of an image capturing lens assembly according to the 4th embodiment of the present disclosure. FIG. 8 shows spherical aberration curves, astigmatic field curves and a distortion curve of the image capturing lens assembly according to the 4th embodiment. In FIG. 7, the image capturing lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 480, an image plane 470 and an image sensor 490, wherein the image capturing lens assembly has a total of six lens elements with refractive power, and an air distance is between two adjacent surfaces of any two adjacent lens elements.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof, that is, the third lens element 430 is meniscus in the paraxial region thereof. The third lens element 430 is made of plastic material, and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof, that is, the fourth lens element 440 is meniscus in the paraxial region thereof. The fourth lens element 440 is made of plastic material, and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof, that is, the fifth lens element 450 is meniscus in the paraxial region thereof. The fifth lens element 450 is made of plastic material and has the object-side surface 451 and the image-side surface 452 being both aspheric, wherein both of the object-side surface 451 and the image-side surface 452 of the fifth lens element 450 have inflection point thereon.

The sixth lens element 460 with positive refractive power has an object-side surface 461 being convex in the paraxial region thereof and an image-side surface 462 being convex in the paraxial region thereof. The sixth lens element 460 is made of plastic material, and has the object-side surface 461 and the image-side surface 462 being both aspheric.

The IR-cut filter 480 is made of glass material located between the sixth lens element 460 and the image plane 470, and will not affect the focal length of the image capturing lens assembly.

The detailed optical data of the 4th embodiment are shown in Table 7 and the aspheric surface data are shown in Table 8 below.

TABLE 7

4th Embodiment
f = 4.94 mm, Fno = 2.80, HFOV = 32.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.142 | | | | |
| 2 | Lens 1 | 2.231 | ASP | 0.642 | Plastic | 1.544 | 55.9 | 3.32 |
| 3 | | −8.489 | ASP | 0.100 | | | | |
| 4 | Lens 2 | 50.678 | ASP | 0.645 | Plastic | 1.639 | 23.5 | −6.35 |
| 5 | | 3.737 | ASP | 0.622 | | | | |
| 6 | Lens 3 | −2.534 | ASP | 0.792 | Plastic | 1.544 | 55.9 | 6.72 |
| 7 | | −1.661 | ASP | 0.351 | | | | |
| 8 | Lens 4 | −2.076 | ASP | 0.300 | Plastic | 1.544 | 55.9 | −13.60 |
| 9 | | −3.033 | ASP | 0.030 | | | | |
| 10 | Lens 5 | 1.627 | ASP | 0.466 | Plastic | 1.650 | 21.4 | −13.73 |
| 11 | | 1.221 | ASP | 0.651 | | | | |
| 12 | Lens 6 | 30.273 | ASP | 0.350 | Plastic | 1.535 | 55.7 | 32.99 |
| 13 | | −42.148 | ASP | 0.400 | | | | |

TABLE 7-continued

4th Embodiment
f = 4.94 mm, Fno = 2.80, HFOV = 32.6 deg.

| Surface # | | Curvature Radius | Thickness | Material | Index | Abbe # | Focal Length |
|---|---|---|---|---|---|---|---|
| 14 | IR-cut filter | Plano | 0.300 | Glass | 1.517 | 64.2 | — |
| 15 | | Plano | 0.405 | | | | |
| 16 | Image | Plano | — | | | | |

Note:
Reference wavelength is 587.6 nm (d-line).

TABLE 8

Aspheric Coefficients

| Surface # | 2 | 3 | 4 | 5 | 6 | 7 |
|---|---|---|---|---|---|---|
| k = | −8.1284E−01 | −7.9711E+01 | −3.2521E+01 | −9.2104E+00 | −1.0706E+01 | 9.5022E−02 |
| A4 = | −6.2124E−03 | −4.6266E−02 | 3.3390E−03 | 5.2569E−02 | −6.3313E−02 | 3.4540E−03 |
| A6 = | −2.6025E−02 | −3.2569E−02 | −2.3246E−02 | −6.4670E−03 | −1.1477E−02 | 3.0521E−03 |
| A8 = | 9.8314E−03 | 1.6676E−02 | 2.4146E−02 | 1.6958E−03 | 3.1858E−03 | 1.8546E−03 |
| A10 = | −2.0536E−02 | −1.3236E−02 | 6.8304E−03 | 1.0195E−02 | 1.3910E−04 | 1.1036E−03 |
| A12 = | −2.7704E−03 | 1.1071E−03 | −5.1003E−03 | −1.4115E−03 | 1.4083E−03 | 5.1968E−04 |
| A14 = | 1.0896E−10 | −1.3120E−03 | 7.2414E−05 | −4.8067E−04 | −5.1771E−04 | 1.8077E−05 |

| Surface # | 8 | 9 | 10 | 11 | 12 | 13 |
|---|---|---|---|---|---|---|
| k = | 1.7177E−01 | −5.6231E+00 | −6.7554E+00 | −5.0531E+00 | −1.0000E+00 | −1.9049E+01 |
| A4 = | −9.3676E−03 | −1.7312E−02 | −4.2938E−02 | −5.0655E−02 | −1.5407E−02 | 1.0955E−02 |
| A6 = | 4.2181E−04 | −3.2947E−03 | 3.0823E−03 | 7.1571E−03 | 2.2281E−03 | −1.6310E−03 |
| A8 = | −1.5032E−04 | −9.3785E−04 | 3.5965E−04 | −4.6543E−04 | −9.2766E−05 | −4.2892E−05 |
| A10 = | 2.2759E−05 | 3.3084E−04 | −7.4470E−05 | 1.4024E−05 | −1.8000E−06 | 5.2799E−06 |
| A12 = | 1.4538E−04 | 1.9363E−05 | 6.1570E−06 | 6.5000E−07 | | 1.7828E−06 |
| A14 = | 2.6987E−05 | | | | | −1.7260E−07 |

In the image capturing lens assembly according to the 4th embodiment, the definitions of these parameters shown in the following table are the same as those stated in the 1st embodiment with corresponding values for the 4th embodiment. Moreover, these parameters can be calculated from Table 7 and Table 8 as the following values and satisfy the following conditions:

| 4th Embodiment | | | |
|---|---|---|---|
| f (mm) | 4.94 | (R5 − R6)/(R5 + R6) | 0.21 |
| Fno | 2.80 | (R7 − R8)/(R7 + R8) | −0.19 |
| HFOV (deg.) | 32.6 | f1/f6 | 0.10 |
| V2 | 23.5 | ANG51a/ANG51b | −1.12 |
| T12/T23 | 0.16 | SD11/SD62 | 0.31 |
| T45/T56 | 0.05 | SL/TL | 0.98 |
| (CT1 + CT2 + CT3 + CT4 + CT5 + CT6)/TD | 0.65 | BL/TL | 0.18 |
| (f/R12)*10 | −1.17 | TL/ImgH | 1.83 |
| R10/R11 | 0.04 | | |

5th Embodiment

Figure 9:
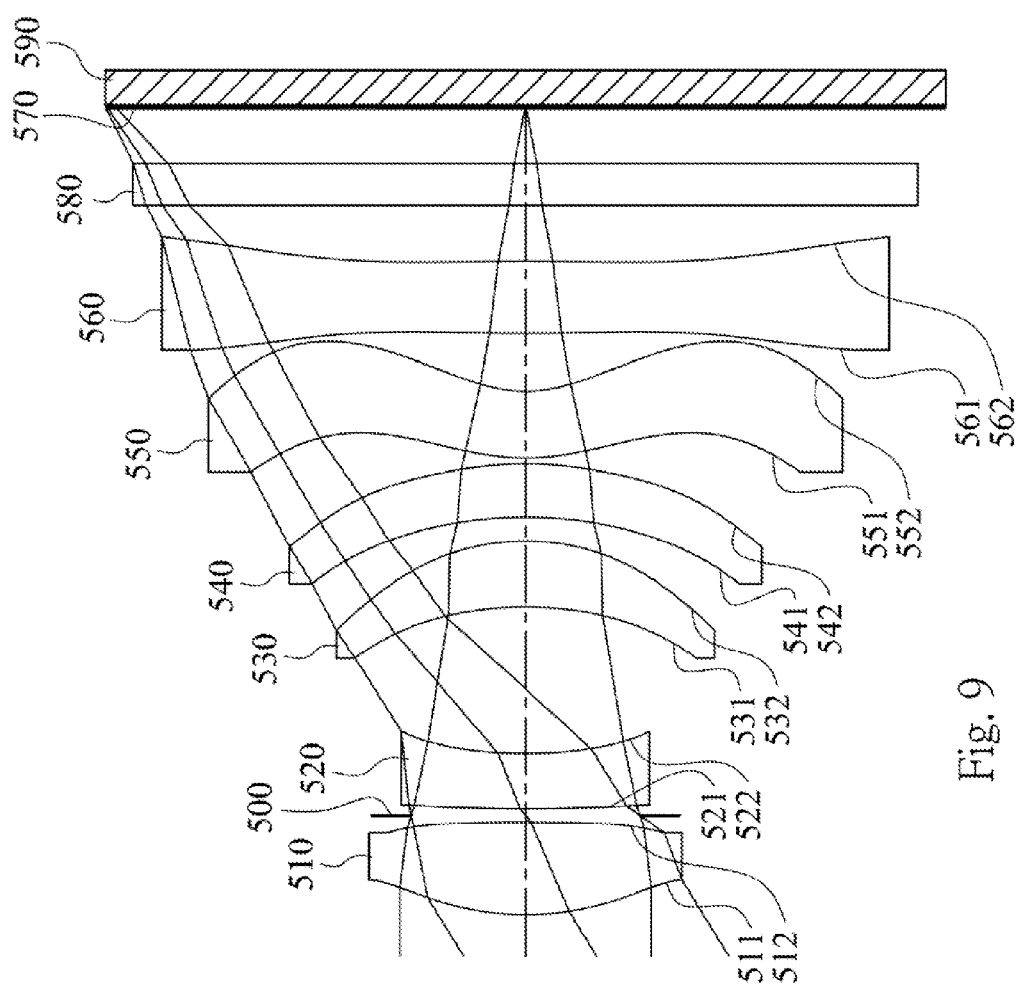
FIG. 9 is a schematic view of an image capturing lens assembly according to the 5th embodiment of the present disclosure.
Figure 10:
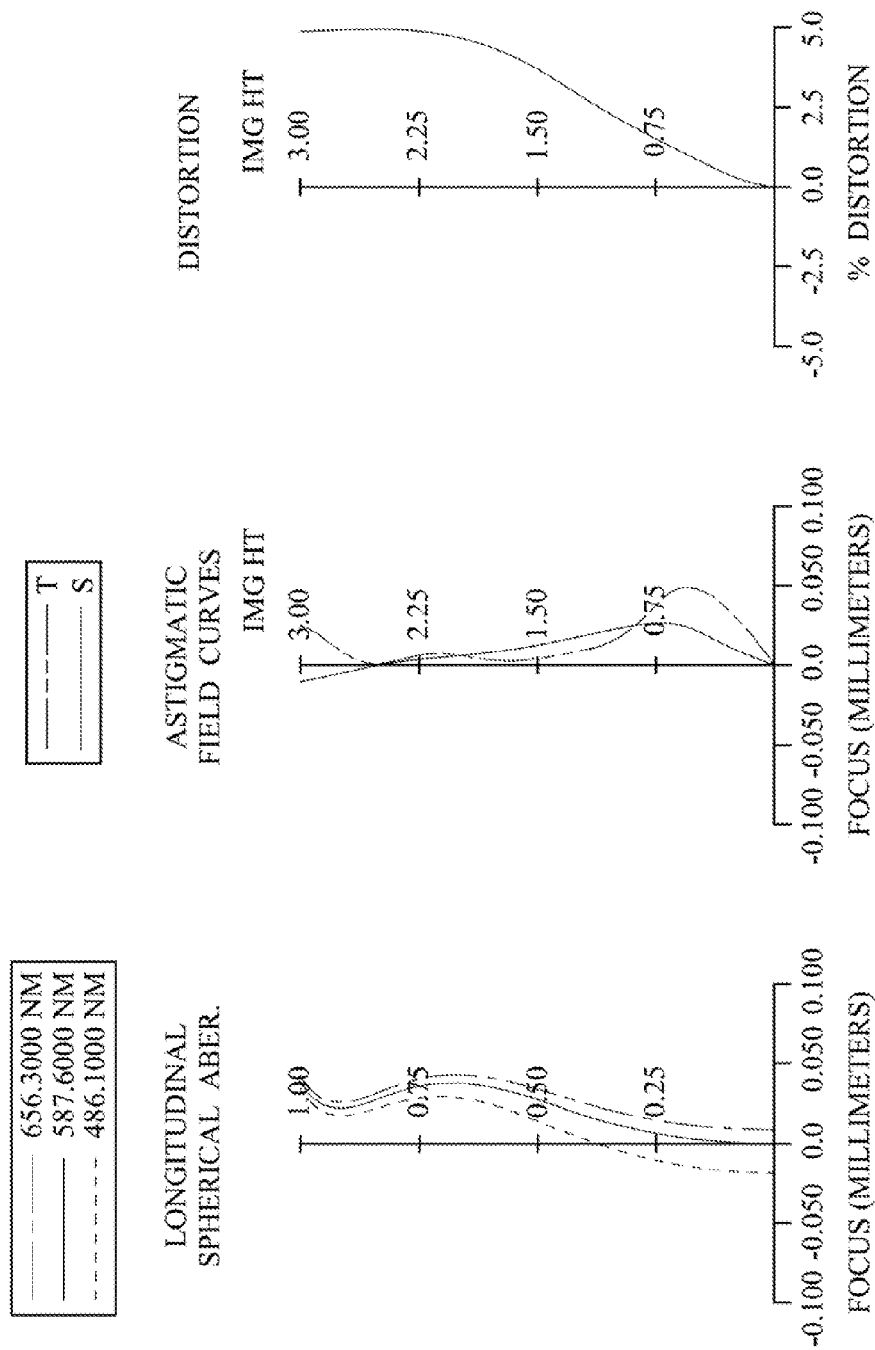
FIG. 10 shows spherical aberration curves, astigmatic field curves and a distortion curve of the image capturing lens assembly according to the 5th embodiment.

FIG. 9 is a schematic view of an image capturing lens assembly according to the 5th embodiment of the present disclosure. FIG. 10 shows spherical aberration curves, astigmatic field curves and a distortion curve of the image capturing lens assembly according to the 5th embodiment. In FIG. 9, the image capturing lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570 and an image sensor 590, wherein the image capturing lens assembly has a total of six lens elements with refractive power, and an air distance is between two adjacent surfaces of any two adjacent lens elements.

The first lens element 510 with positive refractive power has an object-side surface 511 being convex in a paraxial region thereof and an image-side surface 512 being convex in a paraxial region thereof. The first lens element 510 is made of plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof, that is, the third lens element 530 is meniscus in the paraxial region thereof. The third lens element 530 is made of plastic material, and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof, that is, the fourth lens element 540 is meniscus in the paraxial region thereof. The fourth lens element 540 is made of plastic material, and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof, that is, the fifth lens element 550 is meniscus in the paraxial region thereof. The fifth lens element 550 is made of plastic material and has the object-side surface 551 and the image-side surface 552 being both aspheric, wherein both of the object-side surface 551 and the image-side surface 552 of the fifth lens element 550 have inflection point thereon.

The sixth lens element 560 with positive refractive power has an object-side surface 561 being convex in the paraxial region thereof and an image-side surface 562 being convex in the paraxial region thereof. The sixth lens element 560 is made of plastic material, and has the object-side surface 561 and the image-side surface 562 being both aspheric.

The IR-cut filter 580 is made of glass material located between the sixth lens element 560 and the image plane 570, and will not affect the focal length of the image capturing lens assembly.

The detailed optical data of the 5th embodiment are shown in Table 9 and the aspheric surface data are shown in Table 10 below.

TABLE 9

5th Embodiment
f = 4.68 mm, Fno = 2.60, HFOV = 31.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.972 | ASP | 0.661 | Plastic | 1.535 | 56.3 | 3.47 |
| 2 | | −27.101 | ASP | 0.050 | | | | |
| 3 | Ape. Stop | Plano | | 0.050 | | | | |
| 4 | Lens 2 | 15.073 | ASP | 0.395 | Plastic | 1.632 | 23.4 | −6.84 |
| 5 | | 3.326 | ASP | 1.052 | | | | |
| 6 | Lens 3 | −2.452 | ASP | 0.470 | Plastic | 1.514 | 56.8 | 8.35 |
| 7 | | −1.661 | ASP | 0.174 | | | | |
| 8 | Lens 4 | −2.914 | ASP | 0.380 | Plastic | 1.583 | 30.2 | 15.08 |
| 9 | | −2.294 | ASP | 0.040 | | | | |
| 10 | Lens 5 | 1.597 | ASP | 0.481 | Plastic | 1.543 | 56.5 | −4.94 |
| 11 | | 0.895 | ASP | 0.414 | | | | |
| 12 | Lens 6 | 16.797 | ASP | 0.520 | Plastic | 1.535 | 55.7 | 18.10 |
| 13 | | −22.617 | ASP | 0.400 | | | | |
| 14 | IR-cut filter | Plano | | 0.300 | Glass | 1.517 | 64.2 | — |
| 15 | | Plano | | 0.406 | | | | |
| 16 | Image | Plano | | — | | | | |

Note:
Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −5.6756E−01 | −5.0000E+01 | 1.9881E+00 | −3.7494E+00 | −1.4621E+01 | 1.0342E−01 |
| A4 = | −2.1347E−03 | −3.7701E−02 | 2.6876E−03 | 6.2271E−02 | −8.4678E−02 | −1.3103E−02 |
| A6 = | −2.3061E−02 | −3.4804E−02 | −1.4622E−02 | 2.4642E−03 | −1.3332E−02 | 1.2162E−02 |
| A8 = | 1.0252E−02 | 2.5267E−02 | 2.7170E−02 | 1.0181E−02 | 1.3139E−02 | 3.3030E−03 |
| A10 = | −1.3792E−02 | −1.2888E−02 | 1.1457E−02 | 5.9752E−03 | 3.3166E−03 | 1.0658E−03 |
| A12 = | −2.7704E−03 | 1.4589E−03 | −1.5217E−02 | −1.7191E−03 | −1.6819E−03 | 2.4537E−04 |
| A14 = | −1.8635E−09 | −1.3120E−03 | 7.2413E−05 | −4.8067E−04 | −6.0403E−04 | −1.4583E−04 |

| Surface # | 8 | 9 | 10 | 11 | 12 | 13 |
|---|---|---|---|---|---|---|
| K = | −4.8011E−01 | −2.5396E+01 | −5.4914E+00 | −4.2959E+00 | −1.0000E+00 | −8.4357E+01 |
| A4 = | −1.1053E−03 | −3.4019E−02 | −7.2060E−02 | −5.6437E−02 | −2.5968E−02 | 2.1763E−02 |
| A6 = | −1.1587E−03 | −6.7725E−03 | 5.5800E−03 | 3.9438E−03 | 3.7258E−03 | −3.7897E−03 |
| A8 = | −1.6278E−03 | −1.8111E−04 | 2.2800E−04 | −2.1655E−04 | −8.0588E−05 | 2.7490E−04 |
| A10 = | −5.0805E−04 | 5.7709E−04 | −8.6160E−05 | 2.2770E−05 | −8.5986E−06 | −1.0558E−05 |
| A12 = | 1.1185E−04 | 1.2725E−05 | 1.2792E−05 | −1.7113E−06 | | 8.5282E−07 |
| A14 = | 6.4100E−05 | | | | | −5.7923E−08 |

In the image capturing lens assembly according to the 5th embodiment, the definitions of these parameters shown in the following table are the same as those stated in the 1st embodiment with corresponding values for the 5th embodiment. Moreover, these parameters can be calculated from Table 9 and Table 10 as the following values and satisfy the following conditions:

| 5th Embodiment | | | |
|---|---|---|---|
| f (mm) | 4.68 | (R5 − R6)/(R5 + R6) | 0.19 |
| Fno | 2.60 | (R7 − R8)/(R7 + R8) | 0.12 |
| HFOV (deg.) | 31.3 | f1/f6 | 0.19 |
| V2 | 23.4 | ANG51a/ANG51b | −0.38 |
| T12/T23 | 0.10 | SD11/SD62 | 0.43 |
| T45/T56 | 0.10 | SL/TL | 0.88 |
| (CT1 + CT2 + CT3 + | 0.62 | BL/TL | 0.19 |

-continued

| 5th Embodiment | | | |
|---|---|---|---|
| CT4 + CT5 + CT6)/TD | | | |
| (f/R12)*10 | −2.07 | TL/ImgH | 1.93 |
| R10/R11 | 0.05 | | |

6th Embodiment

Figure 11:
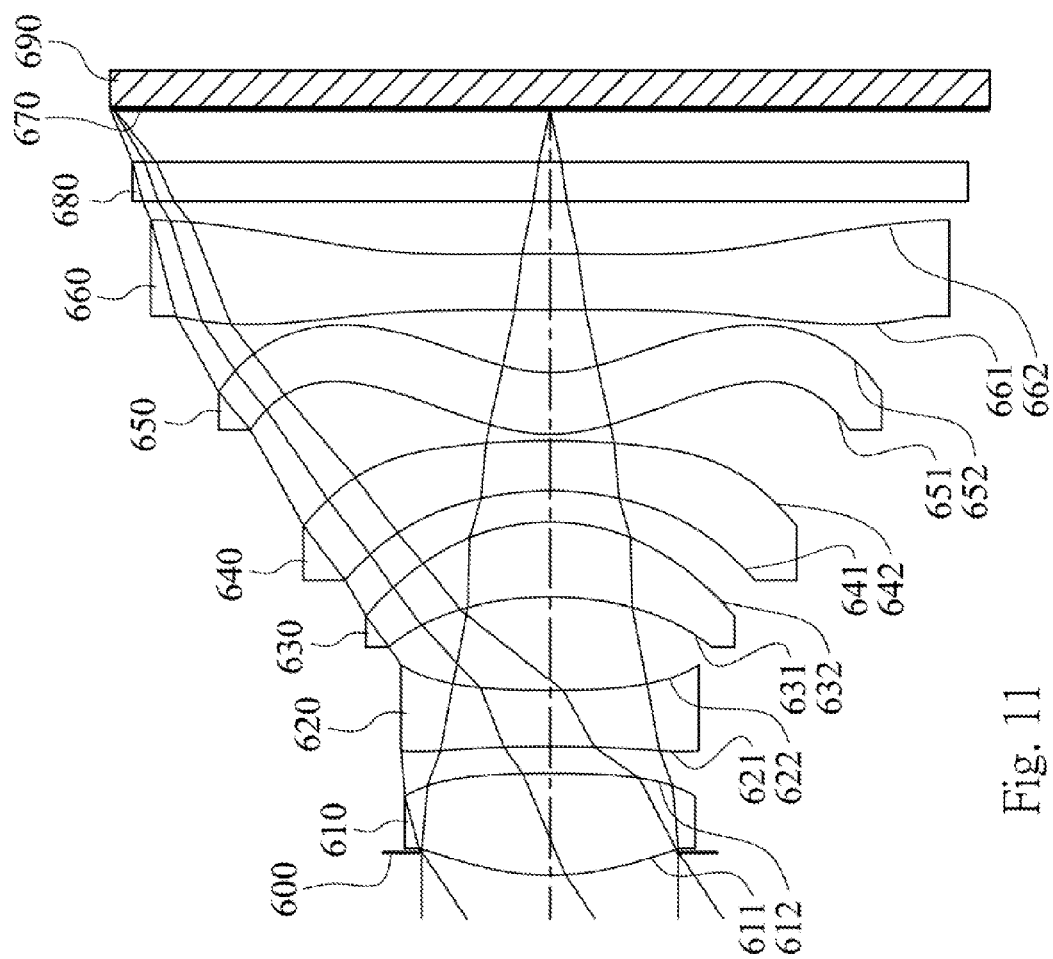
FIG. 11 is a schematic view of an image capturing lens assembly according to the 6th embodiment of the present disclosure.
Figure 12:
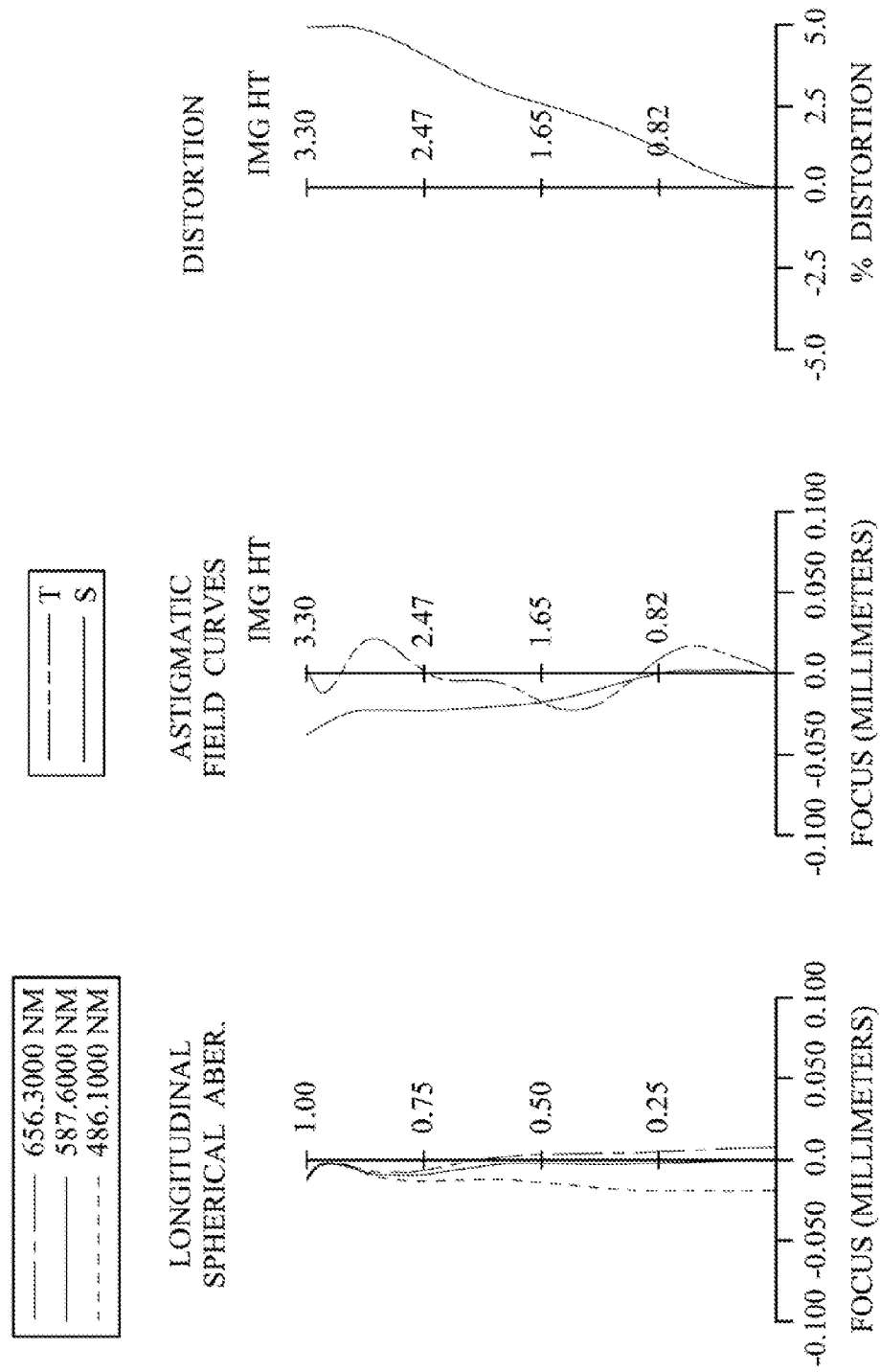
FIG. 12 shows spherical aberration curves, astigmatic field curves and a distortion curve of the image capturing lens assembly according to the 6th embodiment.

FIG. 11 is a schematic view of an image capturing lens assembly according to the 6th embodiment of the present disclosure. FIG. 12 shows spherical aberration curves, astigmatic field curves and a distortion curve of the image capturing lens assembly according to the 6th embodiment. In FIG. 11, the image capturing lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680, an image plane 670 and an image sensor 690, wherein the image capturing lens assembly has a total of six lens elements with refractive power, and an air distance is between two adjacent surfaces of any two adjacent lens elements.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being concave in a paraxial region thereof and an image-side surface 632 being convex in a paraxial region thereof, that is, the third lens element 630 is meniscus in the paraxial region thereof. The third lens element 630 is made of plastic material, and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof, that is, the fourth lens element 640 is meniscus in the paraxial region thereof. The fourth lens element 640 is made of plastic material, and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof, that is, the fifth lens element 650 is meniscus in the paraxial region thereof. The fifth lens element 650 is made of plastic material and has the object-side surface 651 and the image-side surface 652 being both aspheric, wherein both of the object-side surface 651 and the image-side surface 652 of the fifth lens element 650 have inflection point thereon.

The sixth lens element 660 with positive refractive power has an object-side surface 661 being convex in the paraxial region thereof and an image-side surface 662 being convex in the paraxial region thereof. The sixth lens element 660 is made of plastic material, and has the object-side surface 661 and the image-side surface 662 being both aspheric.

The IR-cut filter 680 is made of glass material located between the sixth lens element 660 and the image plane 670, and will not affect the focal length of the image capturing lens assembly.

The detailed optical data of the 6th embodiment are shown in Table 1 and the aspheric surface data are shown in Table 12 below.

TABLE 11

6th Embodiment
f = 4.65 mm, Fno = 2.40, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.175 | | | | |
| 2 | Lens 1 | 2.089 | ASP | 0.773 | Plastic | 1.535 | 56.3 | 3.34 |
| 3 | | −10.652 | ASP | 0.204 | | | | |
| 4 | Lens 2 | −10.844 | ASP | 0.420 | Plastic | 1.632 | 23.4 | −7.07 |
| 5 | | 7.710 | ASP | 0.708 | | | | |
| 6 | Lens 3 | −2.496 | ASP | 0.570 | Plastic | 1.544 | 55.9 | 7.36 |
| 7 | | −1.661 | ASP | 0.235 | | | | |
| 8 | Lens 4 | −2.487 | ASP | 0.380 | Plastic | 1.583 | 30.2 | −7.36 |
| 9 | | −6.205 | ASP | 0.050 | | | | |
| 10 | Lens 5 | 1.318 | ASP | 0.462 | Plastic | 1.650 | 21.4 | 61.48 |
| 11 | | 1.174 | ASP | 0.478 | | | | |
| 12 | Lens 6 | 132.572 | ASP | 0.420 | Plastic | 1.535 | 55.7 | 36.15 |
| 13 | | −22.617 | ASP | 0.400 | | | | |
| 14 | IR-cut filter | Plano | | 0.300 | Glass | 1.517 | 64.2 | — |
| 15 | | Plano | | 0.400 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | −7.1286E−01 | −4.1630E+01 | −2.7059E+01 | −4.9320E+00 | −1.5804E+01 | 1.1700E−01 |
| A4 = | −4.9141E−03 | −4.8857E−02 | 4.5197E−03 | 5.7071E−02 | −8.2559E−02 | −1.8863E−02 |
| A6 = | −2.1899E−02 | −3.9005E−02 | −2.2277E−02 | −3.2852E−03 | −1.1646E−02 | 9.6251E−03 |
| A8 = | 9.6081E−03 | 2.1472E−02 | 2.1342E−02 | 3.9155E−03 | 1.1535E−02 | 3.0122E−03 |
| A10 = | −1.6079E−02 | −1.1527E−02 | 8.4314E−03 | 9.9648E−03 | 6.9141E−04 | 1.1310E−03 |
| A12 = | −2.7704E−03 | 1.4589E−03 | −4.8416E−03 | −1.7191E−03 | −1.6450E−03 | 3.8722E−04 |
| A14 = | 8.2047E−11 | −1.3120E−03 | 7.2414E−05 | −4.8067E−04 | −6.0403E−04 | −2.7499E−05 |

| Surface # | 8 | 9 | 10 | 11 | 12 | 13 |
|---|---|---|---|---|---|---|
| k = | 2.9150E−01 | −8.2602E+01 | −3.5837E+00 | −3.9620E+00 | −1.0000E+00 | −1.0000E+02 |
| A4 = | −1.0611E−02 | −2.4762E−02 | −3.7636E−02 | −4.8190E−02 | −1.8412E−02 | 2.8837E−02 |
| A6 = | −2.4042E−03 | −6.4025E−03 | 3.6483E−03 | 4.6940E−03 | 3.4068E−03 | −4.7561E−03 |
| A8 = | −1.3740E−03 | −6.2574E−04 | −3.6392E−04 | −3.2117E−04 | −1.3792E−04 | 2.1475E−04 |
| A10 = | −3.6984E−04 | 4.0228E−04 | −1.2372E−04 | 6.9451E−06 | −2.5193E−06 | 5.7222E−07 |
| A12 = | 1.4209E−04 | −2.5640E−05 | 1.2875E−05 | −1.4068E−06 | | 1.1293E−06 |
| A14 = | 6.8121E−05 | | | | | −1.0575E−07 |

In the image capturing lens assembly according to the 6th embodiment, the definitions of these parameters shown in the following table are the same as those stated in the 1st embodiment with corresponding values for the 6th embodiment. Moreover, these parameters can be calculated from Table 11 and Table 12 as the following values and satisfy the following conditions:

| 6th Embodiment | | | |
|---|---|---|---|
| f (mm) | 4.65 | (R5 − R6)/(R5 + R6) | 0.20 |
| Fno | 2.40 | (R7 − R8)/(R7 + R8) | −0.43 |
| HFOV (deg.) | 34.1 | f1/f6 | 0.09 |
| V2 | 23.4 | ANG51a/ANG51b | −0.36 |
| T12/T23 | 0.29 | SD11/SD62 | 0.33 |
| T45/T56 | 0.10 | SL/TL | 0.97 |
| (CT1 + CT2 + CT3 + CT4 + CT5 + CT6)/TD | 0.64 | BL/TL | 0.19 |
| (f/R12)*10 | −2.06 | TL/ImgH | 1.76 |
| R10/R11 | 0.01 | | |

7th Embodiment

Figure 13:
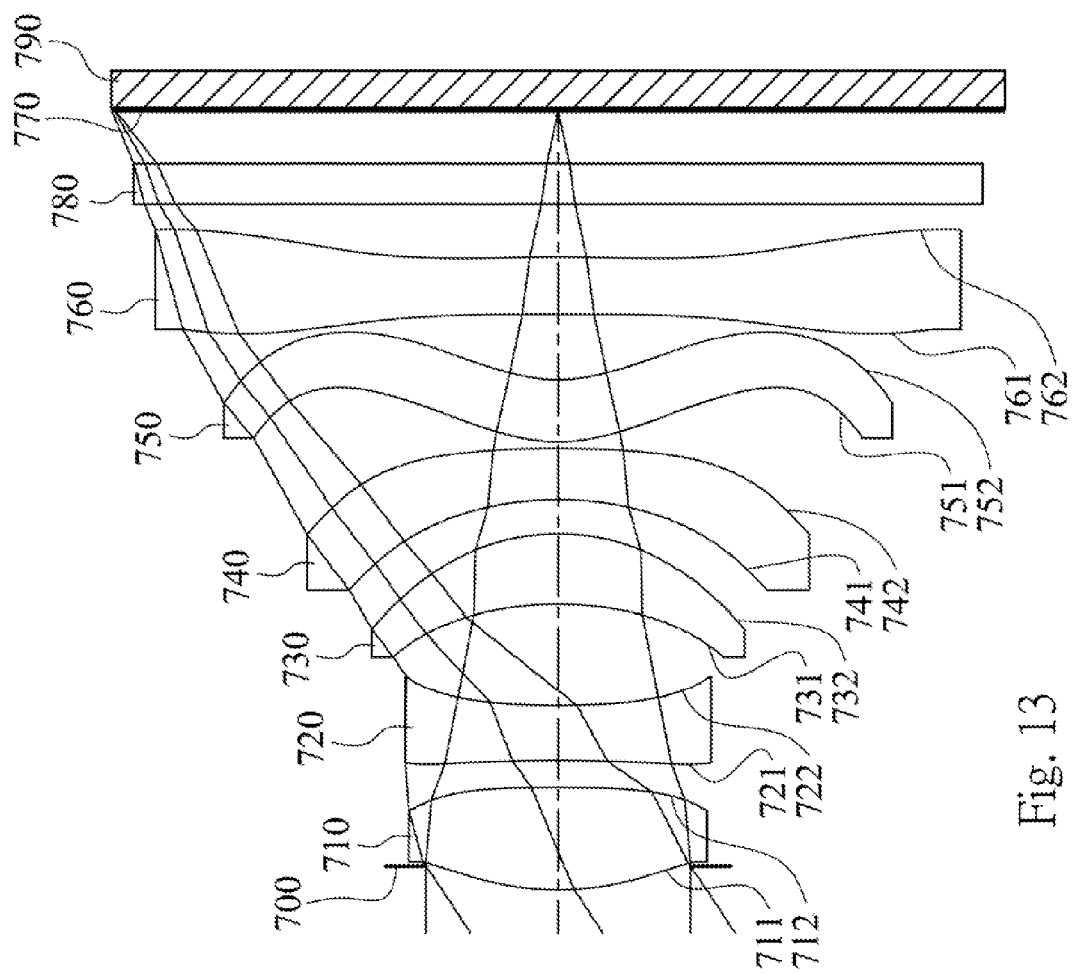
FIG. 13 is a schematic view of an image capturing lens assembly according to the 7th embodiment of the present disclosure.
Figure 14:
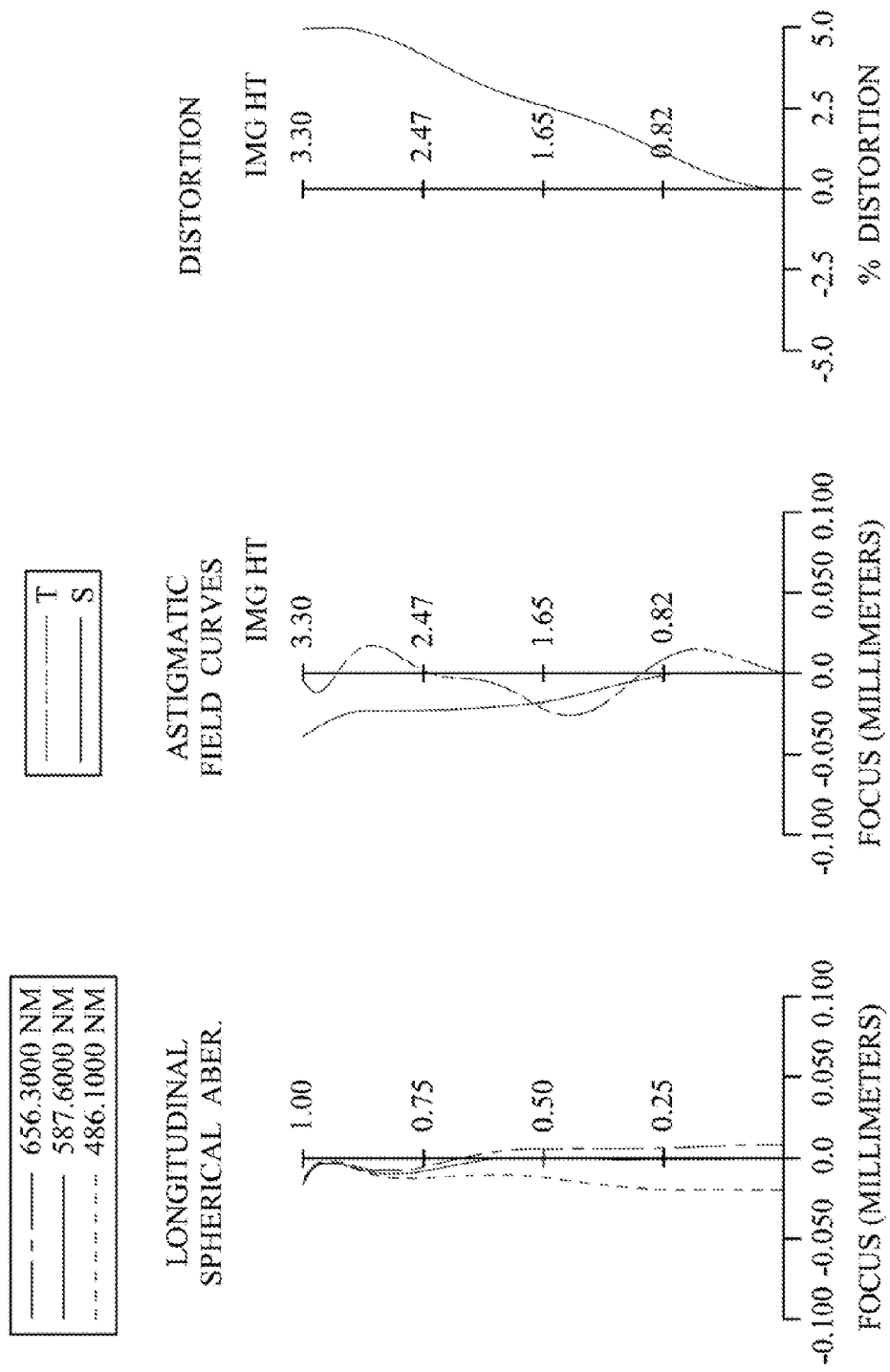
FIG. 14 shows spherical aberration curves, astigmatic field curves and a distortion curve of the image capturing lens assembly according to the 7th embodiment.

FIG. 13 is a schematic view of an image capturing lens assembly according to the 7th embodiment of the present disclosure. FIG. 14 shows spherical aberration curves, astigmatic field curves and a distortion curve of the image capturing lens assembly according to the 7th embodiment. In FIG. 13, the image capturing lens assembly includes, in order from an object side to an image side, an aperture stop 700, a first lens element 710, a second lens element 720, a third lens element 730, a fourth lens element 740, a fifth lens element 750, a sixth lens element 760, an IR-cut filter 780, an image plane 770 and an image sensor 790, wherein the image capturing lens assembly has a total of six lens elements with refractive power, and an air distance is between two adjacent surfaces of any two adjacent lens elements.

The first lens element 710 with positive refractive power has an object-side surface 711 being convex in a paraxial region thereof and an image-side surface 712 being convex in a paraxial region thereof. The first lens element 710 is made of plastic material, and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof, that is, the third lens element 730 is meniscus in the paraxial region thereof. The third lens element 730 is made of plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof, that is, the fourth lens element 740 is meniscus in the paraxial region thereof. The fourth lens element 740 is made of plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof, that is, the fifth lens element 750 is meniscus in the paraxial region thereof. The fifth lens element 750 is made of plastic material and has the object-side surface 751 and the image-side surface 752 being both aspheric, wherein both of the object-side surface 751 and the image-side surface 752 of the fifth lens element 750 have inflection point thereon.

The sixth lens element 760 with positive refractive power has an object-side surface 761 being concave in the paraxial region thereof and an image-side surface 762 being convex in the paraxial region thereof. The sixth lens element 760 is made of plastic material, and has the object-side surface 761 and the image-side surface 762 being both aspheric.

The IR-cut filter 780 is made of glass material located between the sixth lens element 760 and the image plane 770, and will not affect the focal length of the image capturing lens assembly.

The detailed optical data of the 7th embodiment are shown in Table 13 and the aspheric surface data are shown in Table 14 below.

TABLE 13

7th Embodiment
f = 4.72 mm, Fno = 2.40, HFOV = 33.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.180 | | | | |
| 2 | Lens 1 | 2.073 | ASP | 0.765 | Plastic | 1.535 | 56.3 | 3.36 |
| 3 | | −11.647 | ASP | 0.200 | | | | |
| 4 | Lens 2 | −14.134 | ASP | 0.406 | Plastic | 1.632 | 23.4 | −6.99 |
| 5 | | 6.496 | ASP | 0.752 | | | | |
| 6 | Lens 3 | −2.487 | ASP | 0.527 | Plastic | 1.544 | 55.9 | 7.47 |
| 7 | | −1.658 | ASP | 0.254 | | | | |
| 8 | Lens 4 | −2.486 | ASP | 0.380 | Plastic | 1.583 | 30.2 | −6.27 |
| 9 | | −8.197 | ASP | 0.050 | | | | |
| 10 | Lens 5 | 1.271 | ASP | 0.458 | Plastic | 1.650 | 21.4 | 23.08 |
| 11 | | 1.191 | ASP | 0.489 | | | | |
| 12 | Lens 6 | −102.881 | ASP | 0.420 | Plastic | 1.535 | 55.7 | 36.63 |
| 13 | | −16.486 | ASP | 0.400 | | | | |
| 14 | IR-cut filter | Plano | | 0.300 | Glass | 1.517 | 64.2 | — |
| 15 | | Plano | | 0.401 | | | | |
| 16 | Image | Plano | | — | | | | |

Note:
Reference wavelength is 587.6 nm (d-line).

TABLE 14

Aspheric Coefficients

| Surface # | 2 | 3 | 4 | 5 | 6 | 7 |
|---|---|---|---|---|---|---|
| k = | −7.0583E−01 | −4.8021E+01 | −2.4025E+01 | −4.8369E+00 | −1.5443E+01 | 1.2421E−01 |
| A4 = | −4.7902E−03 | −4.8564E−02 | 4.4749E−03 | 5.7243E−02 | −8.3710E−02 | −1.8361E−02 |
| A6 = | −2.1803E−02 | −3.9308E−02 | −2.2520E−02 | −2.8774E−02 | −1.1780E−02 | 9.7924E−03 |
| A8 = | 8.9507E−03 | 2.0940E−02 | 2.1646E−02 | 3.9334E−03 | 1.1545E−02 | 2.9673E−03 |
| A10 = | −1.5200E−02 | −1.0332E−02 | 8.7452E−03 | 1.0196E−02 | 5.8516E−04 | 1.0752E−03 |
| A12 = | −3.0855E−03 | 1.0527E−03 | −4.8446E−03 | −1.6409E−03 | −1.7114E−03 | 3.4161E−04 |
| A14 = | 8.9215E−11 | −1.3120E−03 | 7.2414E−05 | −4.8067E−04 | −7.6847E−04 | −5.9765E−05 |

| Surface # | 8 | 9 | 10 | 11 | 12 | 13 |
|---|---|---|---|---|---|---|
| K = | 2.8257E−01 | −5.0000E+01 | −3.6723E+00 | −3.9713E+00 | −1.0000E+00 | −1.0000E+02 |
| A4 = | −1.0326E−02 | −2.4485E−02 | −3.6796E−02 | −4.8801E−02 | −1.7756E−02 | 2.8989E−02 |
| A6 = | −2.4065E−03 | −6.3408E−03 | 3.4980E−03 | 4.7699E−03 | 3.3529E−03 | −4.7832E−03 |
| A8 = | −1.3887E−03 | −6.2059E−04 | −3.8925E−04 | −3.4369E−04 | −1.3823E−04 | 2.1126E−04 |
| A10 = | −3.7147E−04 | 4.0125E−04 | −1.2331E−04 | 3.0684E−06 | −2.4980E−06 | 7.9096E−07 |
| A12 = | 1.4265E−04 | −2.5274E−05 | 1.2802E−05 | −1.1266E−06 | | 1.0927E−06 |
| A14 = | 6.7161E−05 | | | | | −1.0309E−07 |

In the image capturing lens assembly according to the 7th embodiment, the definitions of these parameters shown in the following table are the same as those stated in the 1st embodiment with corresponding values for the 7th embodiment. Moreover, these parameters can be calculated from Table 13 and Table 14 as the following values and satisfy the following conditions:

| 7th Embodiment | | | |
|---|---|---|---|
| f (mm) | 4.72 | (R5 − R6)/(R5 + R6) | 0.20 |
| Fno | 2.40 | (R7 − R8)/(R7 + R8) | −0.53 |
| HFOV (deg.) | 33.7 | f1/f6 | 0.09 |
| V2 | 23.4 | ANG51a/ANG51b | −0.36 |
| T12/T23 | 0.27 | SD11/SD62 | 0.34 |
| T45/T56 | 0.10 | SL/TL | 0.97 |
| (CT1 + CT2 + CT3 + CT4 + CT5 + CT6)/TD | 0.63 | BL/TL | 0.19 |
| (f/R12)*10 | −2.86 | TL/ImgH | 1.76 |
| R10/R11 | −0.01 | | |

8th Embodiment

Figure 15:
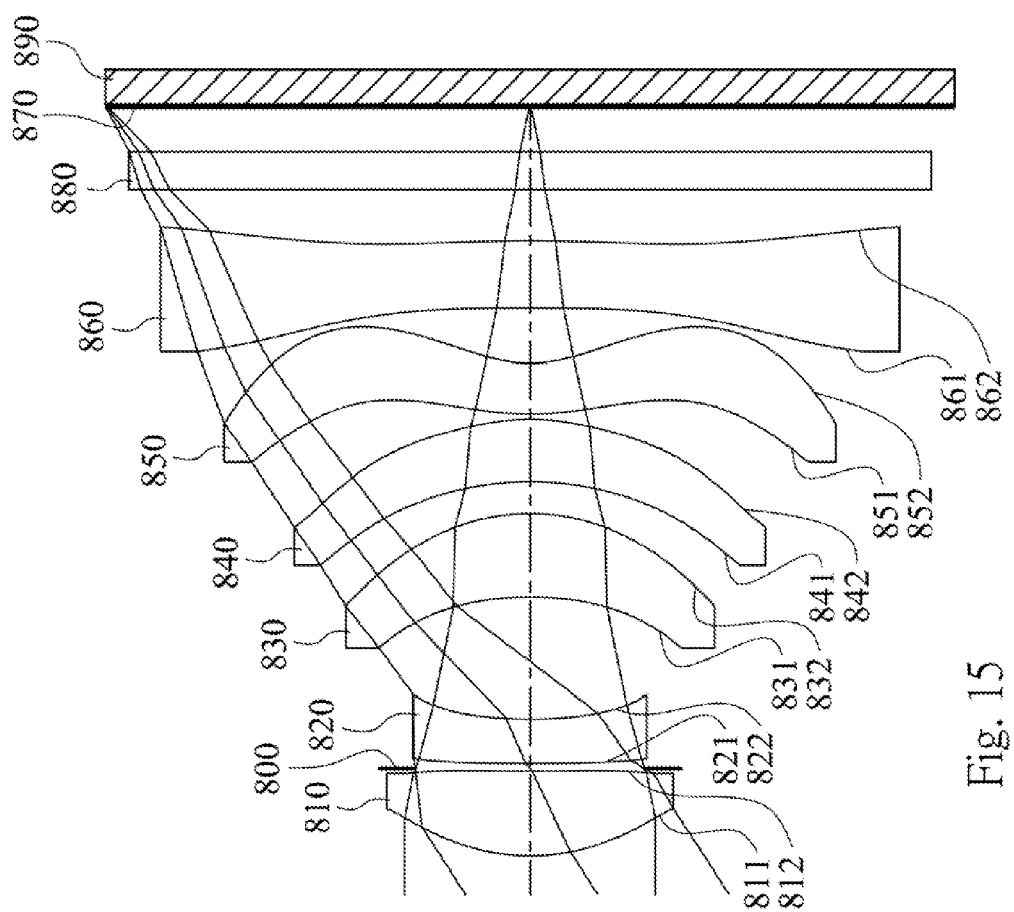
FIG. 15 is a schematic view of an image capturing lens assembly according to the 8th embodiment of the present disclosure.
Figure 16:
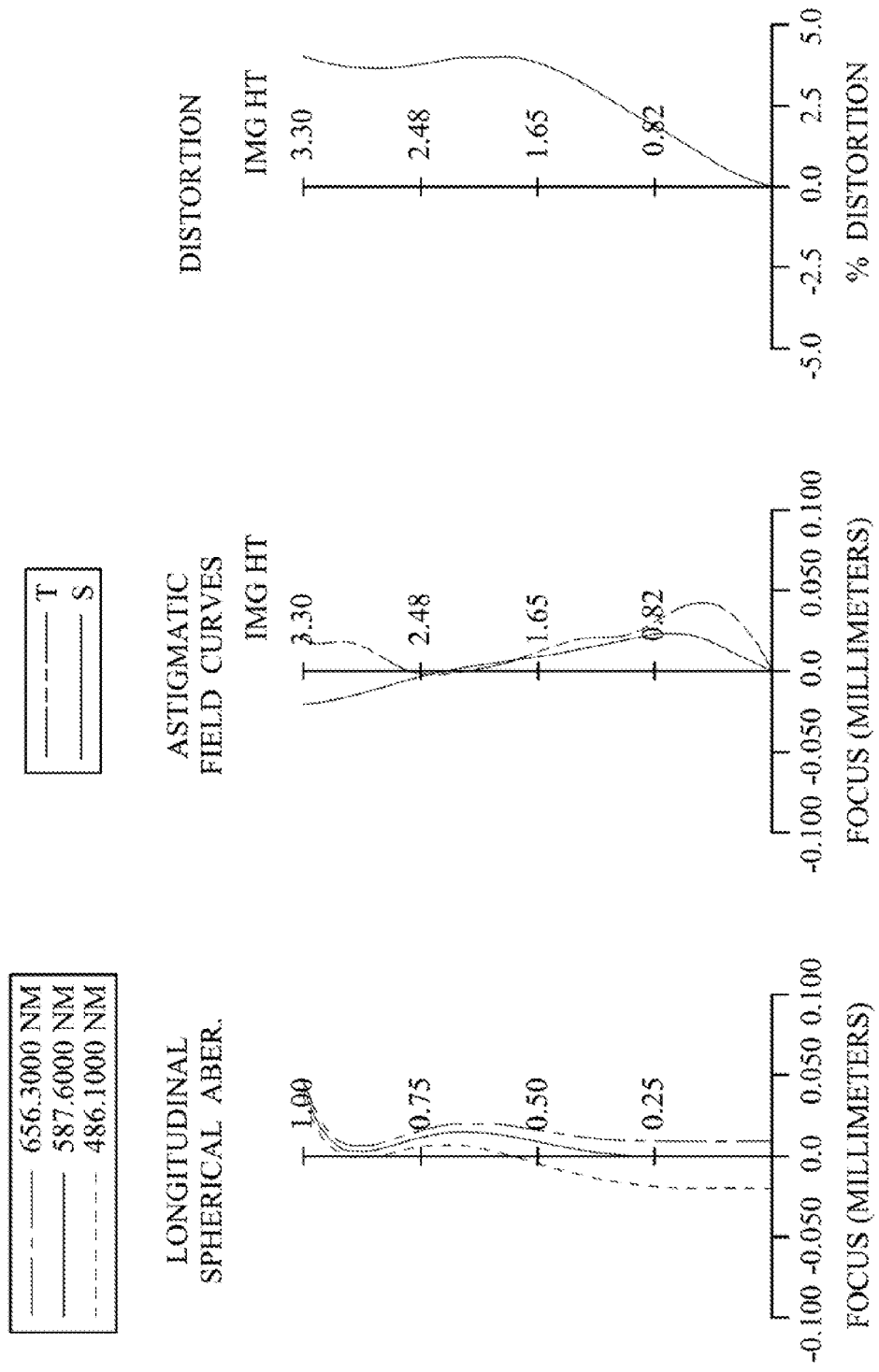
FIG. 16 shows spherical aberration curves, astigmatic field curves and a distortion curve of the image capturing lens assembly according to the 8th embodiment.

FIG. 15 is a schematic view of an image capturing lens assembly according to the 8th embodiment of the present disclosure. FIG. 16 shows spherical aberration curves, astigmatic field curves and a distortion curve of the image capturing lens assembly according to the 8th embodiment. In FIG. 15, the image capturing lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 880, an image plane 870 and an image sensor 890, wherein the image capturing lens assembly has a total of six lens elements with refractive power, and an air distance is between two adjacent surfaces of any two adjacent lens elements.

The first lens element 810 with positive refractive power has an object-side surface 811 being convex in a paraxial region thereof and an image-side surface 812 being concave in a paraxial region thereof. The first lens element 810 is made of plastic material, and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material, and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof, that is, the third lens element 830 is meniscus in the paraxial region thereof. The third lens element 830 is made of plastic material, and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof, that is, the fourth lens element 840 is meniscus in the paraxial region thereof. The fourth lens element 840 is made of plastic material, and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof, that is, the fifth lens element 850 is meniscus in the paraxial region thereof. The fifth lens element 850 is made of plastic material and has the object-side surface 851 and the image-side surface 852 being both aspheric, wherein both of the object-side surface 851 and the image-side surface 852 of the fifth lens element 850 have inflection point thereon.

The sixth lens element 860 with positive refractive power has an object-side surface 861 being concave in the paraxial region thereof and an image-side surface 862 being convex in the paraxial region thereof. The sixth lens element 860 is made of plastic material, and has the object-side surface 861 and the image-side surface 862 being both aspheric.

The IR-cut filter 880 is made of glass material located between the sixth lens element 860 and the image plane 870, and will not affect the focal length of the image capturing lens assembly.

The detailed optical data of the 8th embodiment are shown in Table 15 and the aspheric surface data are shown in Table 16 below.

TABLE 15

8th Embodiment
f = 4.88 mm, Fno = 2.50, HFOV = 33.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.656 ASP | 0.665 | Plastic | 1.535 | 56.3 | 3.35 |
| 2 | | 18.793 ASP | 0.020 | | | | |
| 3 | Ape. Stop | Plano | 0.040 | | | | |
| 4 | Lens 2 | 17.457 ASP | 0.344 | Plastic | 1.640 | 23.3 | −7.18 |
| 5 | | 3.609 ASP | 0.954 | | | | |
| 6 | Lens 3 | −2.455 ASP | 0.651 | Plastic | 1.535 | 56.3 | 7.65 |
| 7 | | −1.676 ASP | 0.249 | | | | |
| 8 | Lens 4 | −2.397 ASP | 0.488 | Plastic | 1.530 | 55.8 | 6.56 |
| 9 | | −1.519 ASP | 0.040 | | | | |
| 10 | Lens 5 | 2.330 ASP | 0.393 | Plastic | 1.530 | 55.8 | −3.32 |
| 11 | | 0.944 ASP | 0.435 | | | | |
| 12 | Lens 6 | −32.761 ASP | 0.520 | Plastic | 1.535 | 56.3 | 32.09 |
| 13 | | −11.321 ASP | 0.400 | | | | |
| 14 | IR-cut filter | Plano | 0.300 | Glass | 1.517 | 64.2 | — |
| 15 | | Plano | 0.353 | | | | |
| 16 | Image | Plano | — | | | | |

Note:
Reference wavelength is 587.6 nm (d-line).

TABLE 16

Aspheric Coefficients

| Surface # | 1 | 2 | 4 | 5 | 6 | 7 |
|---|---|---|---|---|---|---|
| k = | −2.4015E−01 | −5.0000E+01 | −2.5866E+01 | −3.3224E−02 | −7.7810E+00 | 1.1527E−01 |
| A4 = | 6.7933E−03 | −4.4099E−02 | 1.9032E−02 | 7.4134E−02 | −9.4146E−02 | −1.2543E−02 |
| A6 = | −1.5648E−02 | −2.2639E−02 | −6.7120E−03 | 1.2789E−02 | −1.4546E−02 | 1.2030E−02 |
| A8 = | 1.0480E−02 | 3.7489E−02 | 3.2680E−02 | 2.5792E−02 | 1.3589E−02 | 2.8514E−03 |
| A10 = | −8.1967E−03 | −2.1383E−02 | 1.3059E−02 | 1.1217E−02 | 2.6032E−03 | 9.5303E−04 |
| A12 = | −6.5938E−03 | 1.4590E−03 | −1.5217E−02 | −1.7191E−03 | −2.5927E−03 | 2.8044E−04 |
| A14 = | 1.6593E−08 | −1.3119E−03 | 7.2431E−05 | −4.8066E−04 | −5.4415E−04 | −1.0366E−04 |

| Surface # | 8 | 9 | 10 | 11 | 12 | 13 |
|---|---|---|---|---|---|---|
| k = | −5.1756E−01 | −1.3664E+01 | −7.3272E+00 | −5.6209E+00 | −1.0000E+00 | −9.2972E+01 |
| A4 = | −1.2966E−04 | −3.8054E−02 | −7.2807E−02 | −5.7755E−02 | −2.4138E−02 | 1.7829E−02 |
| A6 = | −2.3907E−03 | −6.1273E−03 | 6.2456E−03 | 3.5055E−03 | 3.8508E−03 | −3.2025E−03 |
| A8 = | −1.3968E−03 | −8.4566E−05 | 2.6780E−04 | −2.2792E−04 | −9.0507E−05 | 2.9702E−04 |
| A10 = | −3.2650E−04 | 5.4905E−04 | −9.2935E−05 | 2.4339E−05 | −9.8545E−06 | −1.7911E−05 |

TABLE 16-continued

| Aspheric Coefficients | | | | |
|---|---|---|---|---|
| A12 = | 1.3136E−04 | 3.2108E−06 | 9.1752E−06 | −2.2136E−06 | 9.7080E−07 |
| A14 = | 5.3320E−05 | | | | −4.0696E−08 |

In the image capturing lens assembly according to the 8th embodiment, the definitions of these parameters shown in the following table are the same as those stated in the 1st embodiment with corresponding values for the 8th embodiment. Moreover, these parameters can be calculated from Table 15 and Table 16 as the following values and satisfy the following conditions:

| 8th Embodiment | | | |
|---|---|---|---|
| f (mm) | 4.88 | (R5 − R6)/(R5 + R6) | 0.19 |
| Fno | 2.50 | (R7 − R8)/(R7 + R8) | 0.22 |
| HFOV (deg.) | 33.0 | f1/f6 | 0.10 |
| V2 | 23.3 | ANG51a/ANG51b | −0.22 |
| T12/T23 | 0.06 | SD11/SD62 | 0.39 |
| T45/T56 | 0.09 | SL/TL | 0.88 |
| (CT1 + CT2 + CT3 + CT4 + CT5 + CT6)/TD | 0.64 | BL/TL | 0.18 |
| (f/R12)*10 | −4.31 | TL/ImgH | 1.77 |
| R10/R11 | −0.03 | | |

9th Embodiment

Figure 17:
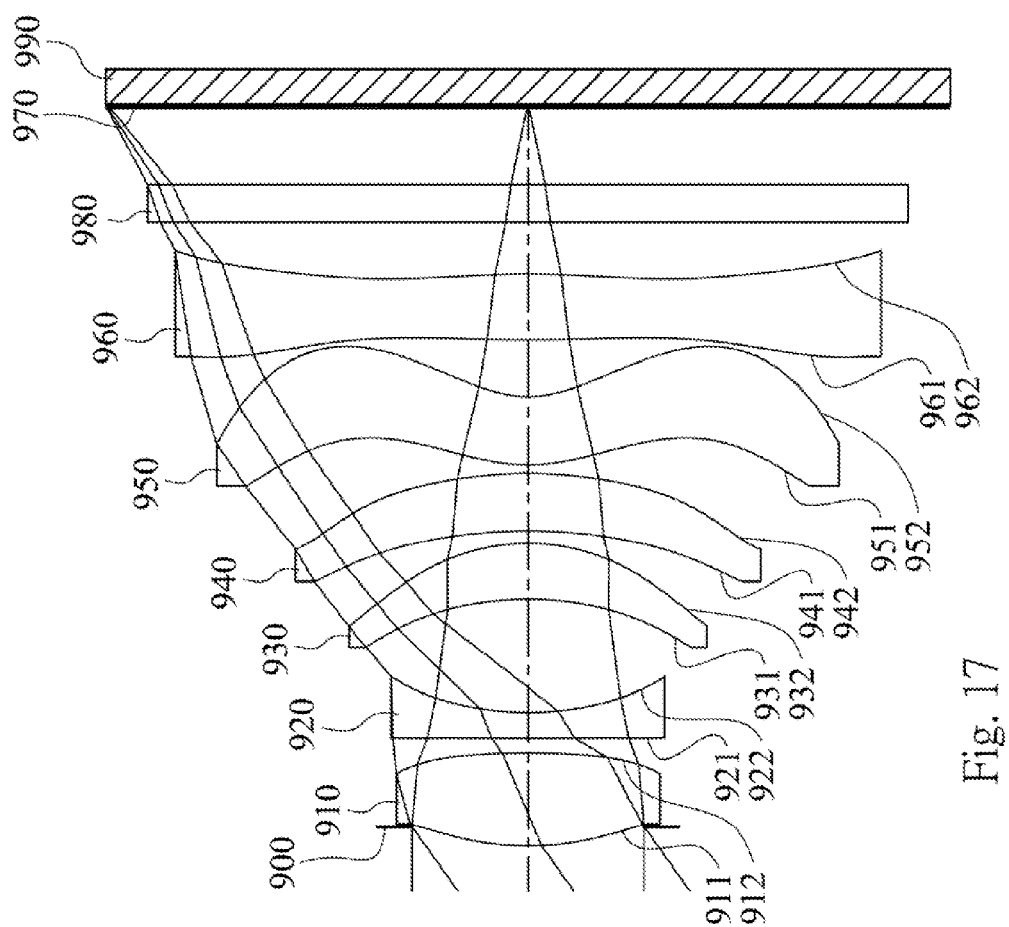
FIG. 17 is a schematic view of an image capturing lens assembly according to the 9th embodiment of the present disclosure.
Figure 18:
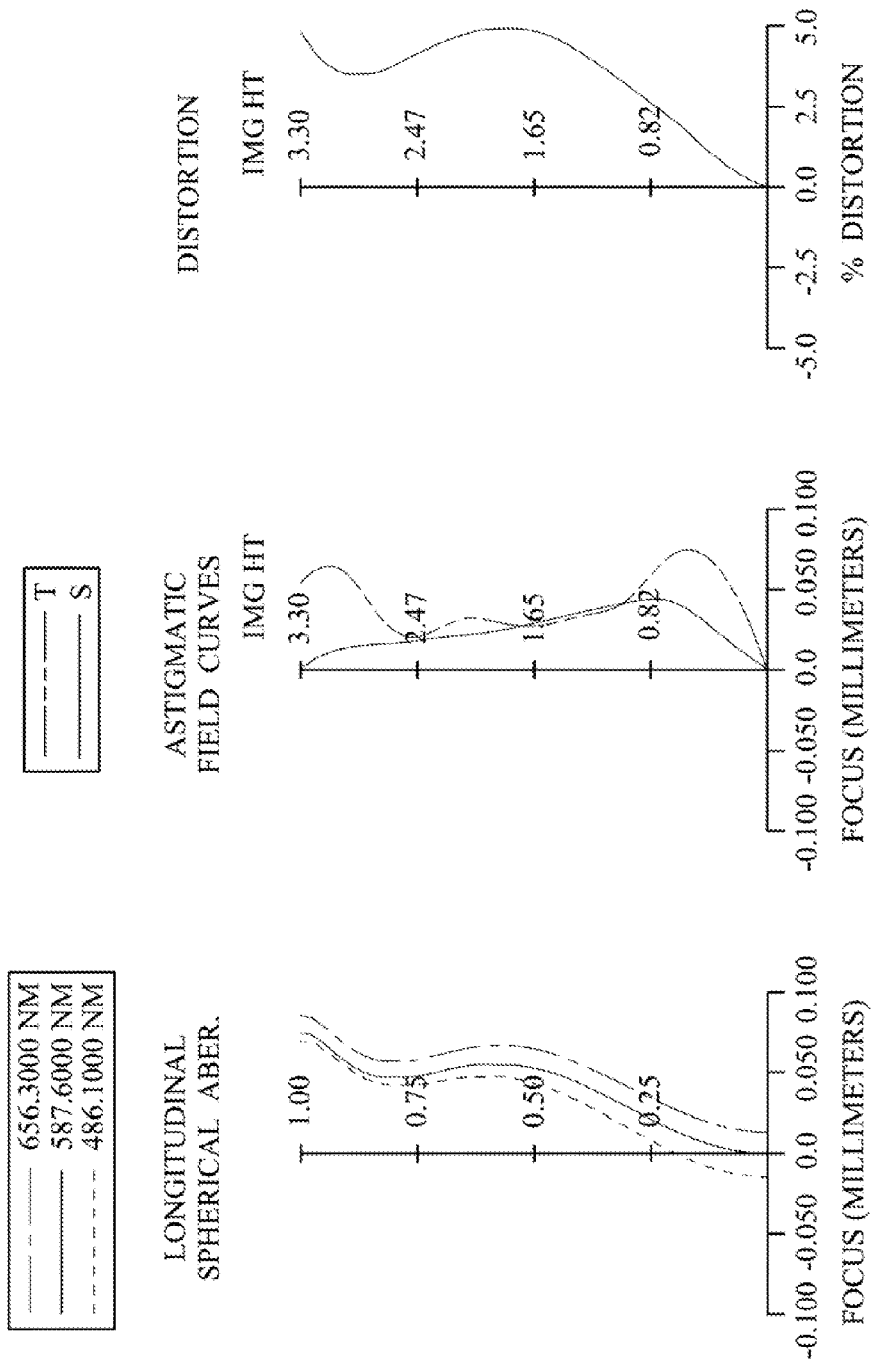
FIG. 18 shows spherical aberration curves, astigmatic field curves and a distortion curve of the image capturing lens assembly according to the 9th embodiment.

FIG. 17 is a schematic view of an image capturing lens assembly according to the 9th embodiment of the present disclosure. FIG. 18 shows spherical aberration curves, astigmatic field curves and a distortion curve of the image capturing lens assembly according to the 9th embodiment. In FIG. 17, the image capturing lens assembly includes, in order from an object side to an image side, an aperture stop 900, a first lens element 910, a second lens element 920, a third lens element 930, a fourth lens element 940, a fifth lens element 950, a sixth lens element 960, an IR-cut filter 980, an image plane 970 and an image sensor 990, wherein the image capturing lens assembly has a total of six lens elements with refractive power, and an air distance is between two adjacent surfaces of any two adjacent lens elements.

The first lens element 910 with positive refractive power has an object-side surface 911 being convex in a paraxial region thereof and an image-side surface 912 being convex in a paraxial region thereof. The first lens element 910 is made of glass material, and has the object-side surface 911 and the image-side surface 912 being both aspheric.

The second lens element 920 with negative refractive power has an object-side surface 921 being convex in a paraxial region thereof and an image-side surface 922 being concave in a paraxial region thereof. The second lens element 920 is made of plastic material, and has the object-side surface 921 and the image-side surface 922 being both aspheric.

The third lens element 930 with positive refractive power has an object-side surface 931 being concave in a paraxial region thereof and an image-side surface 932 being convex in a paraxial region thereof, that is, the third lens element 930 is meniscus in the paraxial region thereof. The third lens element 930 is made of plastic material, and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof, that is, the fourth lens element 940 is meniscus in the paraxial region thereof. The fourth lens element 940 is made of plastic material, and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof, that is, the fifth lens element 950 is meniscus in the paraxial region thereof. The fifth lens element 950 is made of plastic material and has the object-side surface 951 and the image-side surface 952 being both aspheric, wherein both of the object-side surface 951 and the image-side surface 952 of the fifth lens element 950 have inflection point thereon.

The sixth lens element 960 with positive refractive power has an object-side surface 961 being convex in the paraxial region thereof and an image-side surface 962 being convex in the paraxial region thereof. The sixth lens element 960 is made of plastic material, and has the object-side surface 961 and the image-side surface 962 being both aspheric.

The IR-cut filter 980 is made of glass material located between the sixth lens element 960 and the image plane 970, and will not affect the focal length of the image capturing lens assembly.

The detailed optical data of the 9th embodiment are shown in Table 17 and the aspheric surface data are shown in Table 18 below.

TABLE 17

9th Embodiment
f = 4.36 mm, Fno = 2.40, HFOV = 35.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.150 | | | | |
| 2 | Lens 1 | 2.200 | ASP | 0.732 | Glass | 1.581 | 40.7 | 2.88 |
| 3 | | −6.127 | ASP | 0.114 | | | | |
| 4 | Lens 2 | 49.013 | ASP | 0.203 | Plastic | 1.650 | 21.4 | −4.02 |
| 5 | | 2.476 | ASP | 0.888 | | | | |
| 6 | Lens 3 | −2.402 | ASP | 0.434 | Plastic | 1.514 | 56.8 | 8.64 |
| 7 | | −1.654 | ASP | 0.100 | | | | |

TABLE 17-continued

9th Embodiment
f = 4.36 mm, Fno = 2.40, HFOV = 35.6 deg.

| Surface # | | Curvature Radius | | Thickness | Material | Index | Abbe # | Focal Length |
|---|---|---|---|---|---|---|---|---|
| 8 | Lens 4 | −4.000 | ASP | 0.453 | Plastic | 1.583 | 30.2 | 13.37 |
| 9 | | −2.754 | ASP | 0.061 | | | | |
| 10 | Lens 5 | 1.397 | ASP | 0.538 | Plastic | 1.530 | 55.8 | −5.08 |
| 11 | | 0.797 | ASP | 0.442 | | | | |
| 12 | Lens 6 | 11.832 | ASP | 0.520 | Plastic | 1.543 | 56.5 | 7.59 |
| 13 | | −6.239 | ASP | 0.400 | | | | |
| 14 | IR-cut filter | Plano | | 0.300 | Glass | 1.517 | 64.2 | — |
| 15 | | Plano | | 0.617 | | | | |
| 16 | Image | Plano | | — | | | | |

Note:
Reference wavelength is 587.6 nm (d-line).

TABLE 18

| Aspheric Coefficients | | | | | | |
|---|---|---|---|---|---|---|
| Surface # | 2 | 3 | 4 | 5 | 6 | 7 |
| k = | −8.5618E−01 | −5.0000E+01 | −2.4874E+01 | −5.3563E+00 | −1.7017E+01 | 1.1025E−01 |
| A4 = | −6.6482E−03 | −4.0818E−02 | −1.7552E−03 | 5.6215E−02 | −8.4234E−02 | −1.2924E−02 |
| A6 = | −2.0523E−02 | −4.4481E−02 | −2.7474E−02 | −5.8182E−03 | −1.2757E−02 | 1.4204E−02 |
| A8 = | 1.1744E−02 | 1.9409E−02 | 1.2289E−02 | 4.2550E−03 | 1.4357E−02 | 4.1524E−03 |
| A10 = | −2.6195E−02 | −1.4959E−02 | 1.2753E−02 | 7.4390E−03 | 4.0696E−03 | 1.3289E−03 |
| A12 = | −2.7704E−03 | 1.4589E−03 | −3.7200E−03 | −1.7191E−03 | −1.4654E−03 | 3.3303E−04 |
| A14 = | 8.0043E−11 | −1.3120E−03 | 7.2414E−05 | −4.8067E−04 | −7.2533E−04 | −6.8482E−05 |
| Surface # | 8 | 9 | 10 | 11 | 12 | 13 |
| k = | −5.8728E−01 | −4.0066E+01 | −5.1616E+00 | −3.9069E+00 | −1.0000E+00 | −1.0000E+02 |
| A4 = | 2.0387E−04 | −3.5562E−02 | −7.1799E−02 | −5.9523E−02 | −3.0413E−02 | 2.4092E−02 |
| A6 = | −2.7571E−04 | −6.5519E−03 | 6.2171E−03 | 4.0621E−03 | 3.8565E−03 | −4.6842E−03 |
| A8 = | −1.3553E−03 | −8.0818E−05 | 2.5307E−04 | −1.9478E−04 | −5.0151E−05 | 3.7662E−04 |
| A10 = | −4.2990E−04 | 6.0442E−04 | −9.0100E−05 | 1.6327E−05 | −8.1261E−06 | −8.9718E−06 |
| A12 = | 1.1014E−04 | 2.1834E−05 | 9.9416E−06 | −4.2521E−06 | | 6.6981E−07 |
| A14 = | 5.1433E−05 | | | | | −6.2089E−08 |

In the image capturing lens assembly according to the 9th embodiment, the definitions of these parameters shown in the following table are the same as those stated in the 1st embodiment with corresponding values for the 9th embodiment. Moreover, these parameters can be calculated from Table 17 and Table 18 as the following values and satisfy the following conditions:

| | 9th Embodiment | | |
|---|---|---|---|
| f (mm) | 4.36 | (R5 − R6)/(R5 + R6) | 0.18 |
| Fno | 2.40 | (R7 − R8)/(R7 + R8) | 0.18 |
| HFOV (deg.) | 35.6 | f1/f6 | 0.38 |
| V2 | 21.4 | ANG51a/ANG51b | −0.50 |
| T12/T23 | 0.13 | SD11/SD62 | 0.33 |
| T45/T56 | 0.14 | SL/TL | 0.97 |
| (CT1 + CT2 + CT3 + CT4 + CT5 + CT6)/TD | 0.64 | BL/TL | 0.23 |
| (f/R12)*10 | −6.99 | TL/ImgH | 1.76 |
| R10/R11 | 0.07 | | |

The foregoing description, for purpose of explanation, has been described with reference to specific embodiments. It is to be noted that Tables 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly comprising, in order from an object side to an image side:
   a first lens element with positive refractive power having an object-side surface being convex in a paraxial region thereof;
   a second lens element with negative refractive power;
   a third lens element with refractive power;
   a fourth lens element with refractive power;
   a fifth lens element with refractive power having an object-side surface and an image-side surface being both aspheric, wherein at least one of the object-side surface and the image-side surface of the fifth lens element has at least one inflection point thereon; and
   a sixth lens element with positive refractive power having an image-side surface being convex in a paraxial region thereof, wherein an object-side surface and the image-side surface of the sixth lens element are both aspheric;

wherein the image capturing lens assembly has a total of six lens elements with refractive power, and an air distance is between two adjacent surfaces of any two adjacent lens elements; the image capturing lens assembly further comprises a stop located between an object and the third lens element, a focal length of the first lens element is f1, a focal length of the sixth lens element is f6, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, an axial distance between the object-side surface of the first lens element and the image-side surface of the sixth lens element is TD, and the following conditions are satisfied:

$0 < f1/f6 < 0.9$; and $0.55 < (CT1+CT2+CT3+CT4+CT5+CT6)/TD < 0.90$.

2. The image capturing lens assembly of claim 1, wherein the second lens element has an image-side surface being concave in a paraxial region thereof.

3. The image capturing lens assembly of claim 2, wherein the third lens element has an image-side surface being convex in a paraxial region thereof.

4. The image capturing lens assembly of claim 3, wherein the object-side surface of the fifth lens element is convex in a paraxial region thereof.

5. The image capturing lens assembly of claim 4, wherein the fourth lens element has an object-side surface being concave in a paraxial region thereof and an image-side surface being convex in a paraxial region thereof.

6. The image capturing lens assembly of claim 4, wherein the third lens element has an object-side surface being concave in a paraxial region thereof.

7. The image capturing lens assembly of claim 4, wherein the image-side surface of the fifth lens element is concave in a paraxial region thereof.

8. The image capturing lens assembly of claim 4, wherein the object-side surface of the sixth lens element is convex in a paraxial region thereof.

9. The image capturing lens assembly of claim 1, wherein a focal length of the image capturing lens assembly is f, a curvature radius of the image-side surface of the sixth lens element is R12, and the following condition is satisfied:

$-10 < (f/R12) \times 10 < 0$.

10. The image capturing lens assembly of claim 9, wherein the third lens element has positive refractive power, the stop is located between the object and the first lens element, wherein an axial distance between the stop and an image plane is SL, an axial distance between the object-side surface f the first lens element and th e plane is TL, and the following condition is satisfied:

$0.93 < SL/TL < 1.10$.

11. The image capturing lens assembly of claim 9, wherein the third lens element, the fourth lens element and the fifth lens element are meniscus in a paraxial region thereof.

12. The image capturing lens assembly of claim 9, wherein an axial distance between the fourth lens element and the fifth lens element is T45, an axial distance between the fifth lens element and the sixth lens element is T56, and the following condition is satisfied:

$0.03 < T45/T56 < 0.45$.

13. The image capturing lens assembly of claim 9, wherein an Abbe number of the second lens element is V2, and the following condition is satisfied:

$V2 < 25$.

14. The image capturing lens assembly of claim 9, wherein a curvature radius of an object-side surface of the third lens element is R5, a curvature radius of an image-side surface of the third lens element is R6, and the following condition is satisfied:

$0.1 < (R5-R6)/(R5+R6) < 0.3$.

15. The image capturing lens assembly of claim 1, wherein a vertical distance between a maximum effective semi-diameter position on the object side surface of the first lens element and an optical axis is SD11, a vertical distance between a maximum effective semi-diameter position on the image-side surface of the sixth lens element and the optical axis is SD62, and the following condition is satisfied:

$0.2 < SD11/SD62 < 0.50$.

16. The image capturing lens assembly of claim 1, wherein an angle between a tangent line extended from a position on the object-side surface of the fifth lens element at a height of one third of the maximum effective semi-diameter and a normal line to an optical axis is ANG51a, an angle between a tangent line extended from a maximum effective semi-diameter position on the object-side surface of the fifth lens element and a normal line to the optical axis is ANG51b, and the following condition is satisfied:

$-3.0 < ANG51a/ANG51b < 0$.

17. An image capturing lens assembly comprising, in order from an object side to an image side:
  a first lens element with positive refractive power having an object-side surface being convex in a paraxial region thereof;
  a second lens element with negative refractive power;
  a third lens element with refractive power;
  a fourth lens element with refractive power;
  a fifth lens element with refractive power having an object-side surface and an image-side surface being both aspheric, wherein at least one of the object-side surface and the image-side surface has at least one inflection point hereon; and
  a sixth lens element with positive refractive power having an image-side surface being convex in a paraxial region thereof, wherein an object-side surface and the image-side surface of the sixth lens element are both aspheric;
  wherein the image capturing lens assembly has a total of six lens elements with refractive power, the g capturing lens assembly further comprises a stop located between an object and the third lens element, a focal length of the first lens element is f1, a focal length of the sixth lens element is f6, a curvature radius of the image-side surface of the fifth lens element is R10, a curvature radius of the object-side surface of the sixth lens element is R11, and the following conditions are satisfied:

$0 < f1/f6 < 0.9$; and $-0.3 < R10/R11 < 0.5$.

18. The image capturing lens assembly of claim 17, wherein the object-side surface of the fifth lens element is convex in a paraxial region thereof, and the image-side surface of the fifth lens element is concave in a paraxial region thereof.

19. The image capturing lens assembly of claim 18, wherein both of the object-side surface and the image-side surface of the fifth lens element have at least one inflection point thereon.

20. The image capturing lens assembly of claim 19, wherein the fifth lens element has negative refractive power, an axial distance between the first lens element and the second lens element is T12, an axial distance between the second lens element and the third lens element is T23, and the following condition is satisfied:

$0.03 < T12/T23 < 0.4.$

21. The image capturing lens assembly of claim 17, wherein the second lens element has an image-side surface being concave at a paraxial region thereof, the third lens element has an image-side surface being convex at a paraxial region thereof, an axial distance between the image-side surface of the sixth lens element and an image plane is BL, an axial distance between the object-side surface of the first lens element and the image plane is TL, and the following condition is satisfied:

$0 < BL/TL < 0.35.$

22. The image capturing lens assembly of claim 21, wherein an axial distance between the stop and the image plane is SL, the axial distance between th object-side surface of the first lens element and the image plane is TL, and the following condition is satisfied:

$0.80 < SL/TL < 1.20.$

23. The image capturing lens assembly of claim 22, wherein curvature radius of an image-side surface of the fourth lens element is R8, and the following condition is satisfied:

$-0.6 < (R7-R8)/(R7+R8) < 0.4.$

24. The image capturing lens assembly of claim 22, wherein the focal length of the first lens element is f1 the focal length of the sixth lens element is f6, and the following condition is satisfied:

$0 < f1/f6 < 0.5.$

25. The image capturing lens assembly of claim 17, further comprises:
an image sensor located on an image plane, wherein a maximum image height of the image capturing lens assembly is ImgH, an axial distance between the object-side surface of the first lens element and the image plane is TL, and the following condition is satisfied:

$TL/ImgH < 2.0.$

26. An image capturing device, comprising:
the image capturing lens assembly of claim 17.

* * * * *